United States Patent
Chen et al.

(10) Patent No.: US 12,428,102 B2
(45) Date of Patent: Sep. 30, 2025

(54) MOTORIZED MID-DRIVE UNIT

(71) Applicant: Razor USA LLC, Cerritos, CA (US)

(72) Inventors: Robert Chen, Cerritos, CA (US); Yau Wang, Cerritos, CA (US); Louis Lu, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 620 days.

(21) Appl. No.: 17/748,442

(22) Filed: May 19, 2022

(65) Prior Publication Data

US 2022/0371686 A1 Nov. 24, 2022

Related U.S. Application Data

(60) Provisional application No. 63/260,729, filed on Aug. 30, 2021, provisional application No. 63/190,403, filed on May 19, 2021.

(51) Int. Cl.
| | | |
|---|---|---|
| *B62K 25/30* | (2006.01) | |
| *B62K 3/02* | (2006.01) | |
| *B62K 19/34* | (2006.01) | |
| *B62K 25/04* | (2006.01) | |
| *B62M 3/00* | (2006.01) | |
| *B62M 6/55* | (2010.01) | |

(52) U.S. Cl.
CPC .............. *B62M 6/55* (2013.01); *B62K 19/34* (2013.01); *B62M 3/003* (2013.01)

(58) Field of Classification Search
CPC ........ B62M 6/55; B62M 3/003; B62M 11/14; B62M 6/45; B62M 6/90; B62K 19/34
USPC .............................................. 180/206.1, 220
See application file for complete search history.

(56) References Cited

U.S. PATENT DOCUMENTS

| | | | |
|---|---|---|---|
| 3,704,759 A | 12/1972 | Vitkov et al. | |
| 3,737,000 A | 6/1973 | Knobloch et al. | |
| (Continued) | | | |

FOREIGN PATENT DOCUMENTS

| | | |
|---|---|---|
| AU | 416302 B2 | 8/1971 |
| CN | 2314959 Y | 4/1999 |
| (Continued) | | |

OTHER PUBLICATIONS

Chinese Journal: Planetary gear transmission design, published Sep. 30, 2003, in 9 pages.

(Continued)

*Primary Examiner* — Valentin Neacsu
*Assistant Examiner* — Nabin Kumar Sharma
(74) *Attorney, Agent, or Firm* — Knobbe Martens Olson & Bear LLP

(57) ABSTRACT

A vehicle may include a pedal assembly, a motor assembly, and a drive unit that may be used to allow selective usage of one or both of the pedal assembly and the motor assembly to convey power to a driven wheel of the vehicle. The drive unit can include a gearbox that may enclose components which form at least part of a first power path between the pedal assembly and the driven wheel and a second power path between the motor assembly and the driven wheel. The first and second power paths can converge at a component within the gearbox. One-way bearings at points in the first and second power paths prior to the convergence of the power paths can inhibit or prevent the pedal assembly from being affected by operation of the motor assembly, and vice versa.

20 Claims, 32 Drawing Sheets

(56) References Cited

U.S. PATENT DOCUMENTS

| | | |
|---|---|---|
| 3,770,075 A | 11/1973 | Vegners |
| 3,812,928 A | 5/1974 | Rockwell et al. |
| 3,897,843 A | 8/1975 | Hapeman et al. |
| 4,424,879 A | 1/1984 | Sonzogni |
| 4,617,839 A | 10/1986 | Matoba |
| 5,246,082 A | 9/1993 | Alber |
| 5,616,097 A | 4/1997 | Dammon |
| 5,928,099 A | 7/1999 | Tsunemi |
| 6,276,475 B1 | 8/2001 | Nakanosono |
| 6,355,996 B1 | 3/2002 | Birkestrand |
| 6,367,571 B1 | 4/2002 | Scwarz |
| 6,458,057 B2 | 10/2002 | Massaccesi |
| 6,524,206 B2 | 2/2003 | Tsunemi |
| 6,702,070 B2 | 3/2004 | Smith |
| 6,712,727 B2 | 3/2004 | Kujira et al. |
| 6,749,532 B2 | 6/2004 | Wachauer |
| 6,931,959 B2 | 8/2005 | Giuriati |
| 6,974,399 B2 | 12/2005 | Lo |
| 7,249,643 B2 | 7/2007 | Etzioni et al. |
| 7,375,450 B2 | 5/2008 | Tanaka et al. |
| 7,886,858 B2 | 2/2011 | Ai |
| 8,186,467 B2 | 5/2012 | Yoshino et al. |
| 8,245,804 B2 | 8/2012 | van Rooij |
| 8,316,973 B2 | 11/2012 | Walter et al. |
| 8,323,143 B2 | 12/2012 | Schoon |
| 8,348,798 B2 | 1/2013 | Lo |
| 8,419,581 B2 | 4/2013 | Lo |
| 8,449,424 B2 | 5/2013 | Schoon |
| 8,628,449 B1 | 1/2014 | Burgman et al. |
| 8,662,277 B2 | 3/2014 | Schoon |
| 8,674,573 B2 | 3/2014 | Adachi |
| 8,702,549 B2 | 4/2014 | Yoshino et al. |
| 8,783,393 B2 | 7/2014 | Besler |
| 8,795,120 B2 | 8/2014 | Kim |
| 9,017,206 B2 | 4/2015 | Nakamura et al. |
| 9,046,154 B2 | 6/2015 | Ishizuka |
| 9,103,380 B2 | 8/2015 | Hirano |
| 9,303,727 B2 | 4/2016 | Reimann |
| 9,308,965 B2 | 4/2016 | Folmli et al. |
| 9,638,285 B2 | 5/2017 | Huang |
| 9,660,500 B2 | 5/2017 | Huang |
| 9,758,213 B2 | 9/2017 | Kawakami |
| 9,855,992 B1 | 1/2018 | Liang |
| 9,914,348 B2 | 3/2018 | Koval et al. |
| 9,950,562 B2 | 4/2018 | Forrest |
| 10,226,997 B2 | 3/2019 | Huang |
| 10,432,064 B2 | 10/2019 | Huang |
| 10,479,190 B2 | 11/2019 | Li et al. |
| 10,897,181 B2 | 1/2021 | Huang |
| 10,899,224 B2 | 1/2021 | Huang |
| 11,472,284 B2 | 10/2022 | Huang |
| 11,901,796 B2 | 2/2024 | Huang |
| 12,240,559 B2 | 3/2025 | Chen et al. |
| 2004/0012246 A1 | 1/2004 | Rhyne et al. |
| 2005/0176542 A1 | 8/2005 | Lo |
| 2005/0264112 A1 | 12/2005 | Tanaka et al. |
| 2009/0032321 A1 | 2/2009 | Marsh et al. |
| 2010/0304918 A1 | 12/2010 | Burgman et al. |
| 2010/0307851 A1 | 12/2010 | Spanski et al. |
| 2012/0083375 A1 | 4/2012 | Lo |
| 2012/0083376 A1 | 4/2012 | Lo |
| 2012/0309578 A1 | 12/2012 | Solka |
| 2013/0012350 A1 | 1/2013 | Ebner |
| 2013/0109526 A1 | 5/2013 | Oishi |
| 2013/0192400 A1 | 8/2013 | Dodo et al. |
| 2013/0284527 A1 | 10/2013 | Murakami et al. |
| 2014/0080652 A1 | 3/2014 | Kim |
| 2014/0135166 A1 | 5/2014 | Wang et al. |
| 2015/0239527 A1 | 8/2015 | Huang |
| 2015/0246710 A1 | 9/2015 | Yeh |
| 2015/0247539 A1 | 9/2015 | Yeh |
| 2016/0107721 A1 | 4/2016 | Urabe et al. |
| 2016/0263987 A1 | 9/2016 | Brownell et al. |
| 2016/0297500 A1 | 10/2016 | Dubose |
| 2017/0152002 A1 | 6/2017 | Yamamoto |
| 2018/0022411 A1 | 1/2018 | Kistemaker et al. |
| 2020/0384806 A1 | 12/2020 | Falls et al. |
| 2021/0023699 A1 | 1/2021 | Darby |
| 2021/0031615 A1 | 2/2021 | Li et al. |
| 2023/0099907 A1 | 3/2023 | Chung et al. |
| 2024/0351664 A1 | 10/2024 | Chen et al. |
| 2024/0359556 A1 | 10/2024 | Huang |
| 2024/0400152 A1* | 12/2024 | Wei .................. B62M 9/121 |

FOREIGN PATENT DOCUMENTS

| | | | |
|---|---|---|---|
| CN | 1702015 A | 11/2005 | |
| CN | 201447041 U | 5/2010 | |
| CN | 20292823 U | 5/2013 | |
| DE | 2051686 A1 | 4/1971 | |
| DE | 10103726 A1 | 8/2002 | |
| DE | 202019103283 U1 * | 8/2019 | ............. B62M 6/55 |
| DE | 102019123326 A1 | 3/2021 | |
| EP | 1601085 | 11/2005 | |
| EP | 2586694 | 5/2013 | |
| EP | 2483142 B1 | 9/2015 | |
| EP | 2982592 A1 * | 2/2016 | ............. B62M 11/02 |
| EP | 3441296 A1 * | 2/2019 | ............. B62J 45/411 |
| KR | 20090103259 A | 10/2009 | |
| KR | 20160041733 A | 4/2016 | |
| TW | M390917 U1 | 10/2010 | |
| WO | WO 2011/013109 A1 | 2/2011 | |
| WO | WO 2016/183095 A1 | 11/2016 | |
| WO | WO 2019/180857 A1 | 5/2020 | |
| WO | WO 2022/246094 A1 | 11/2022 | |
| WO | WO 2022/266369 A1 | 12/2022 | |

OTHER PUBLICATIONS

International Search Report and Written Opinion in corresponding International Patent Application No. PCT/US2022/030081, mailed Sep. 7, 2022, in 17 pages.

International Preliminary Report on Patentability in corresponding International Patent Application No. PCT/US2022/030081, dated Nov. 30, 2023, in 12 pages.

* cited by examiner

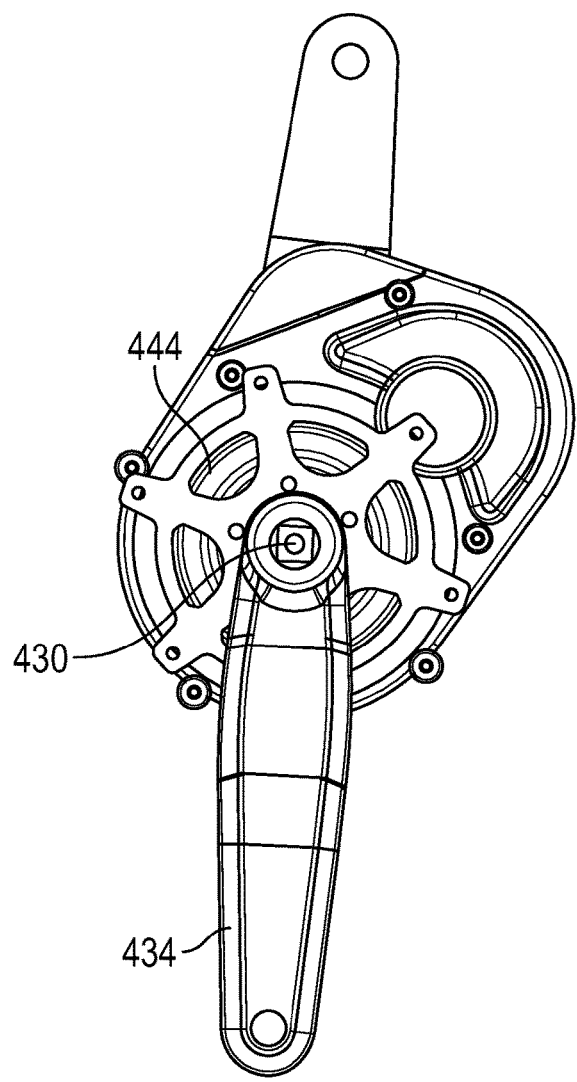 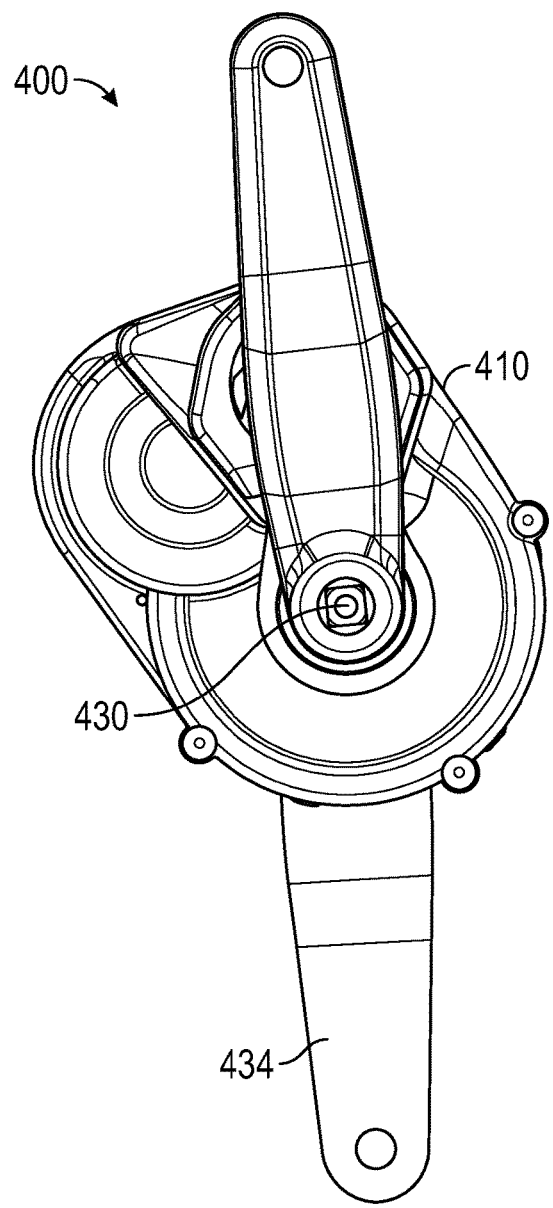
FIG. 10B
FIG. 10C

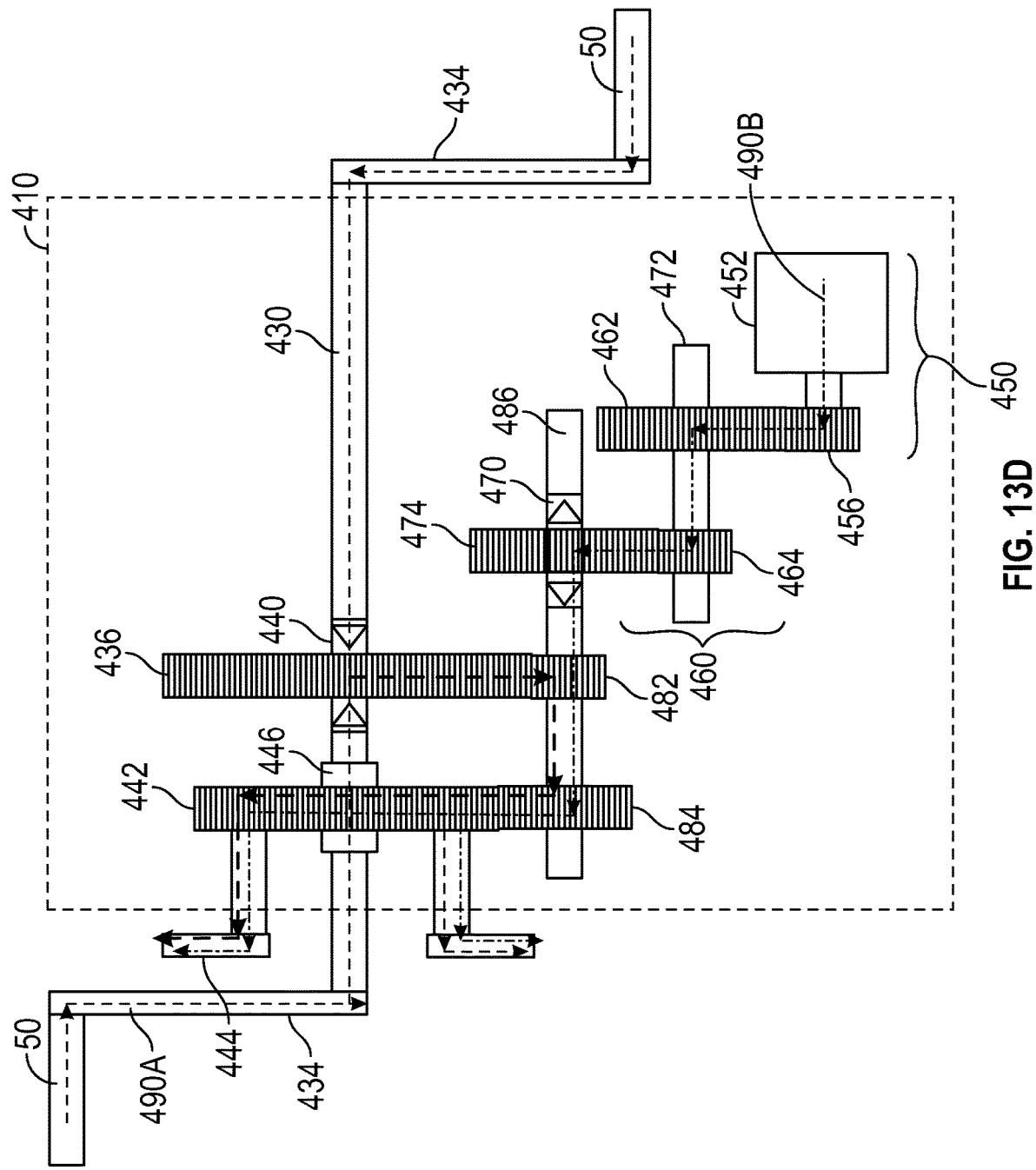

MOTORIZED MID-DRIVE UNIT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the priority benefit of U.S. Provisional Patent Application No. 63/260,729, filed Aug. 30, 2021 and of U.S. Provisional Patent Application No. 63/190,403, filed May 19, 2021, the entirety of each of which is incorporated by reference herein.

BACKGROUND

Field of the Invention

This disclosure relates generally to wheeled vehicles, such as bicycles and tricycles including both a pedal assembly and a motor assembly.

Description of the Related Art

Wheeled vehicles can be driven by a pedal assembly which rotates a chain wheel axially offset from a driven wheel of the vehicle. A chain can be used to deliver power from the chain wheel to the driven wheel of a vehicle. Such vehicles can alternately be driven by a motor configured to convey power to the driven wheel of a vehicle. When the motor is also used to drive the chain wheel, operation of the motor can impact the operation of the pedal assembly, driving undesired movement of the pedal assembly. The presence of the motor can also introduce frictional loss into operation of the pedal assembly.

SUMMARY

In a first broad aspect, a gearbox adapted for use on a mid-drive e-bike is provided, the e-bike having footpedals and a driven wheel, the gearbox including an electric motor, a plurality of gears, a first one-way bearing, and a second one-way bearing, the first one-way bearing configured to enable power from the electric motor to be delivered to the driven wheel, the second one-way bearing configured to enable power from the footpedals to be delivered to the driven wheel, and the gearbox configured to enable a user to propel the e-bike with the footpedals alone, with the electric motor alone, and simultaneously with the footpedals and the electric motor.

The gearbox can include a chain wheel configured to receive power from the electric motor and the footpedals and deliver the power to the drive wheel via a chain. The gearbox can additionally include a bottom bracket shaft rotationally coupled to the footpedals, where the chain wheel is rotationally coupled to an output gear supported the bottom bracket shaft. The output gear can be conditionally rotationally coupled to the bottom bracket shaft by the second one-way bearing. The output gear can be supported on the bottom bracket shaft by a rotary bearing which allows the output gear to rotate independent of the bottom bracket shaft when no power is being provided via the footpedals.

The plurality of gears can include an intermediate step gear set forming part of a motor power path from the electric motor to the chain wheel. The intermediate step gear set can include an upper step gear set conditionally rotationally coupled to a lower step gear set by the first one-way bearing. The gearbox can form part of a mid-drive unit axially offset from an axis of rotation of the driven wheel.

In another broad aspect, a bicycle is provided, including a frame, a driven wheel supported by the frame, a pedal assembly, an electric motor, and a gearbox supported by the frame, the gearbox including a first one-way bearing forming part of a motor power path between the electric motor and an output gear operably coupled to the driven wheel to deliver power to the driven wheel, and a second one-way bearing forming part of a pedal power path between the pedal assembly and the output gear.

The pedal assembly can include a bottom bracket shaft extending through at least a portion of the gearbox, and first and second pedal cranks rotationally coupled to the bottom bracket shaft at respective ends of the bottom bracket shaft. The output gear can be supported on the bottom bracket shaft by the second one-way bearing.

The output gear can be supported on the bottom bracket shaft by a rotary bearing, the gearbox additionally including a pedal output gear supported on the bottom bracket shaft by the second one-way bearing. The first one-way bearing can support a motor transfer gear on an intermediate shaft axially offset from the bottom bracket shaft, the motor transfer gear operably connected to the electric motor. The intermediate shaft can be rotationally coupled to a first offset gear engaged with the pedal output gear and a second offset gear engaged with the output gear. The motor transfer gear can be operably connected to the electric motor by an intermediate step gear set supported by a step gear shaft.

In another embodiment, a gearbox configured to be secured to a bicycle frame is provided, the gearbox including a chain wheel configured to engage a chain of the bicycle to deliver the power to a drive wheel of the bicycle via a chain, a bottom bracket shaft configured to receive power from a pedal assembly of the bicycle, a step gear configured to receive power from an electric motor, a first one-way bearing forming part of a pedal power path between at least the bottom bracket shaft and an output gear operably coupled to the chain wheel, and a second one-way bearing forming part of a motor power path between at least the step gear and the output gear operably coupled to the chain wheel.

The output gear can be supported on the bottom bracket shaft by the first one-way bearing. The first one-way bearing and the output gear can be supported on the bottom bracket shaft at different locations along the bottom bracket shaft. The step gear can be supported on a step gear shaft by the second one-way bearing. The gearbox can additionally include the electric motor, the electric motor located at least partially within a housing of the gearbox.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

FIG. 10B illustrates a right side view of the gearbox of FIG. 10A. FIG. 10C illustrates a left side view of the gearbox of FIG. 10A.

FIG. 13D is the schematic illustration of FIG. 13A, with combined power paths shown for motive power simultaneously provided via both the pedal assembly and the motor assembly.

DETAILED DESCRIPTION OF CERTAIN EMBODIMENTS

The disclosed technology relates to motorized drive units that can be used with a vehicle, such as an electric bicycle. At least some components of the motorized drive unit can be positioned in a middle section of a vehicle, such as between a front and rear wheel of a vehicle. In some embodiments, the components positioned in a middle section of the vehicle can include a mid-drive motor, which can be used with an electric bicycle, also referred to as a mid-drive e-bike. Such motorized mid-drive units can be configured for use on a variety of bicycles, including bicycles, tricycles, and other pedaled vehicles. Certain embodiments of a mid-drive unit, and components thereof, are disclosed in the accompanying figures, which form a part hereof. In certain embodiments, a mid-drive unit can include a small motor, speed reducing gears, and at least two one-way bearings.

Overview

In certain embodiments, a vehicle such as a mid-drive e-bike can comprise a gearbox. The gearbox can include a motor and one or more gears. The motor can be powered by a battery, which can be positioned in or adjacent to the gearbox, or elsewhere on the bike. The gearbox can be configured to mate with a portion of a bike, such as a bottom bracket shell of a bike. The bottom bracket shell can be a tubular member which can extend generally horizontal to the ground when the bike is operated and/or can be the bracket through which the manual pedal mechanism is typically mounted to the bike, as discussed in greater detail herein.

The gearbox can comprise an electric motor, a plurality of gears, a first one-way bearing, and a second one-way bearing. The first one-way bearing can be configured to form or connect part of a first power path to enable power from the electric motor to be delivered to a driven wheel of the bike, and/or to isolate or disconnect the electric motor from a second power path which enables power to be delivered from footpedals of a pedal assembly of the bike to the driven wheel of the bike. The second one-way bearing can be configured to form or connect part of the second power path which can enable power from the pedal assembly to be delivered to the driven wheel, and/or to isolate or disconnect the pedal assembly from the first power path. The gearbox can be configured to enable a user to drive the bike (e.g., apply motive force to the driven wheel) with the pedal assembly and the electric motor simultaneously.

In certain implementations, due to the one-way bearings located along each power path, when the motor is providing power to the driven wheel, the user can hold the pedals in a stationary position, or spin the pedals backward. Similarly, in various embodiments, pedaling by the user does not cause driving of the motor and/or the motor does not provide resistance against pedaling. In some embodiments, the electric motor can be small enough in size to avoid interference with the user being able to pedal the bike.

FIGS. 1A-7C

Figure 1A:
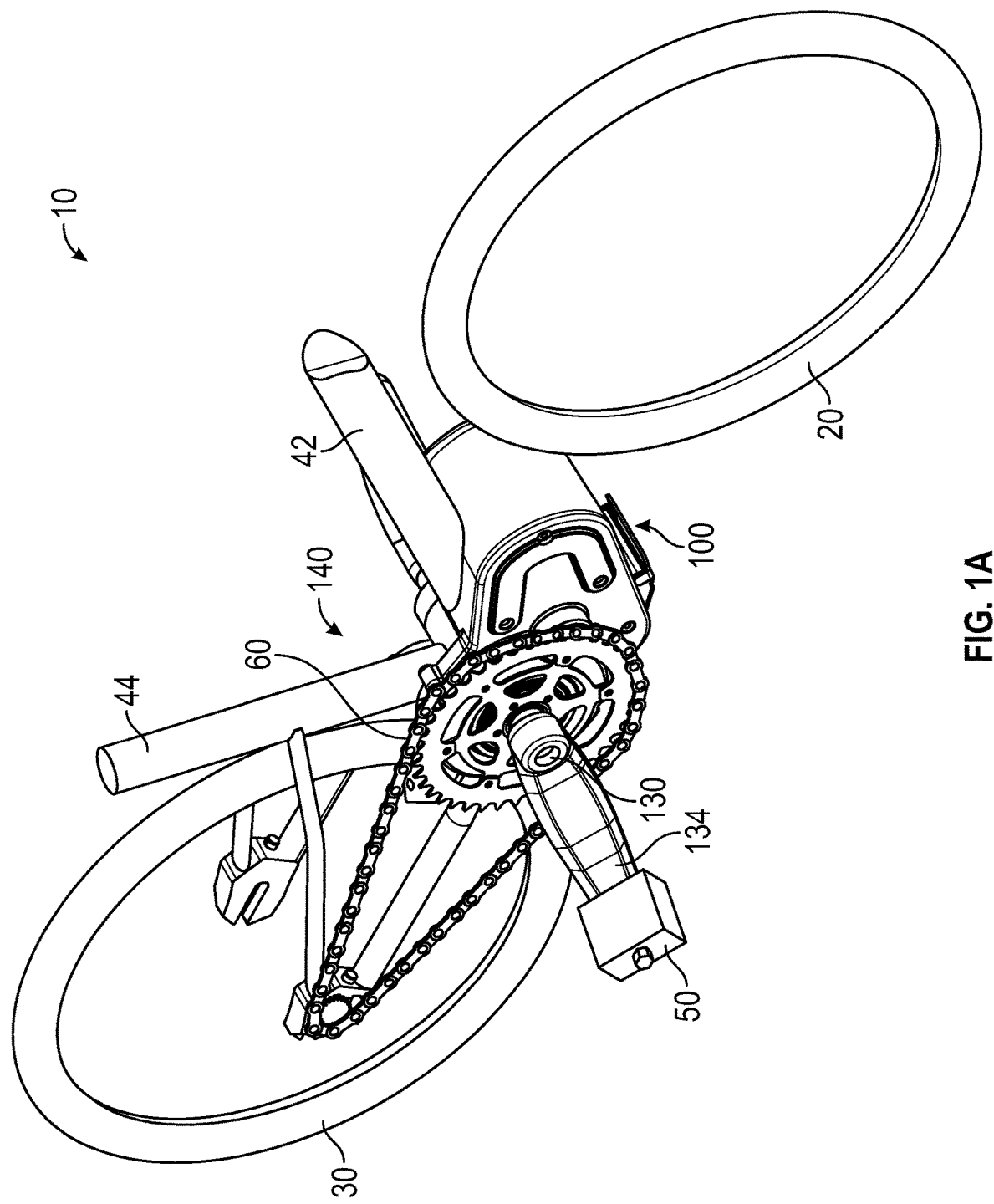
FIG. 1A illustrates a perspective view of an embodiment of a vehicle including a pedal assembly and a mid-drive unit including a motor configured to provide motive power to the vehicle.
Figure 1B:
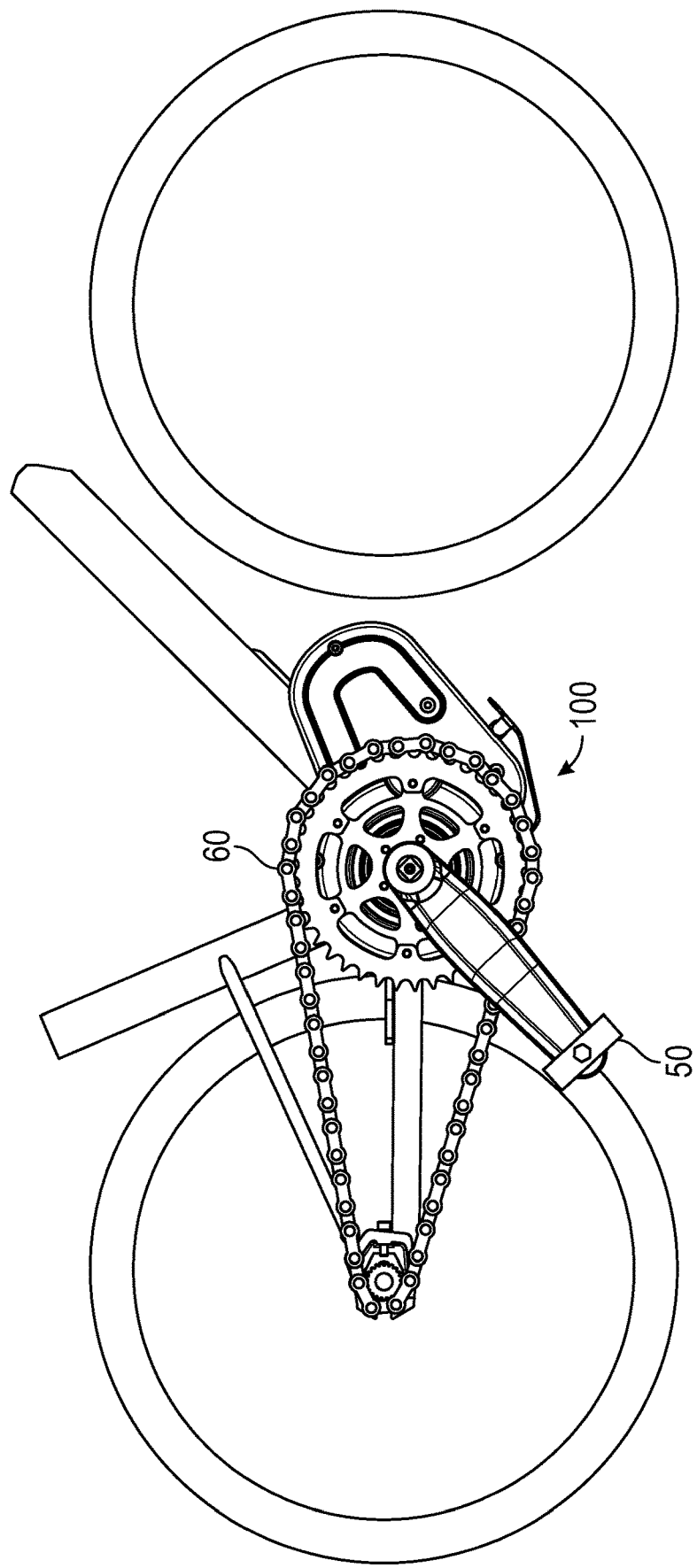
FIG. 1B is a right side view of the vehicle of FIG. 1A.
Figure 1C:
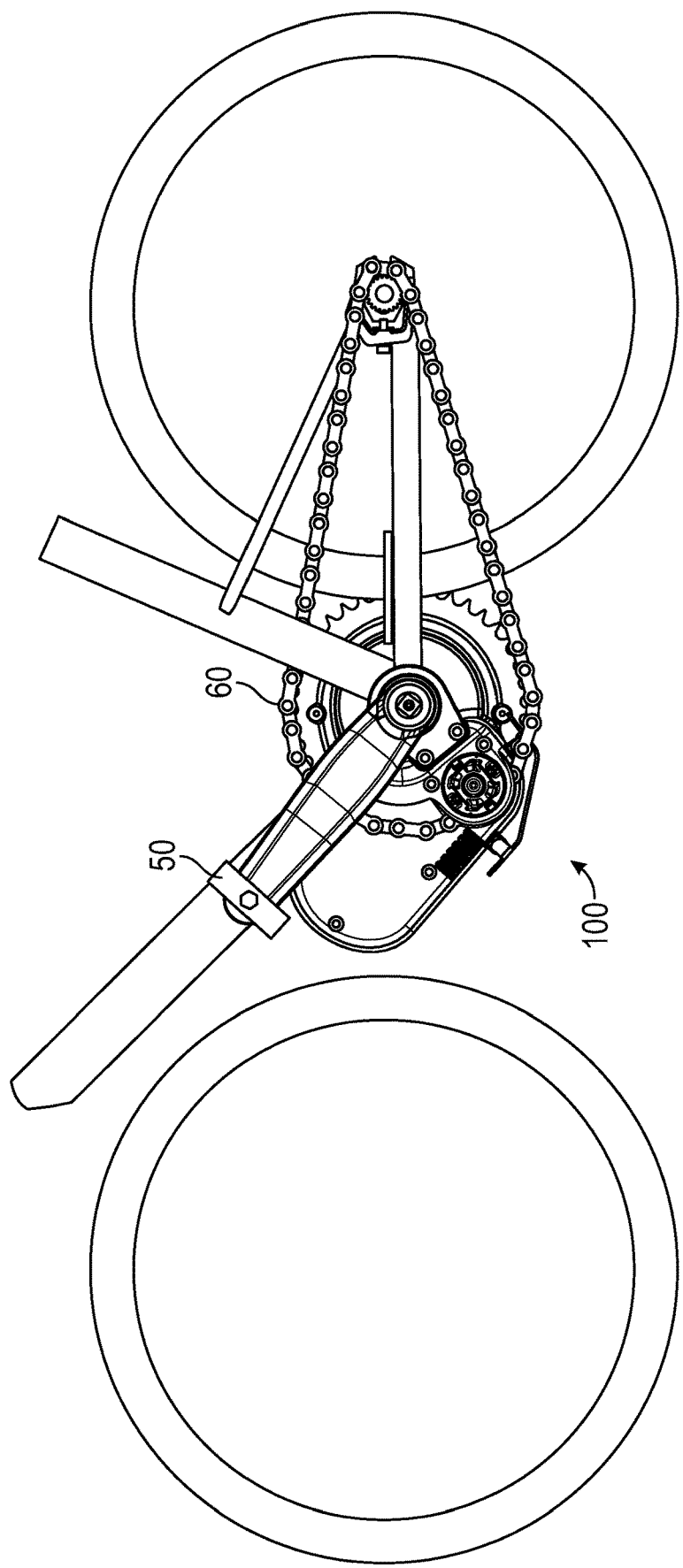
FIG. 1C is a left side view of the vehicle of FIG. 1A.
Figure 1D:
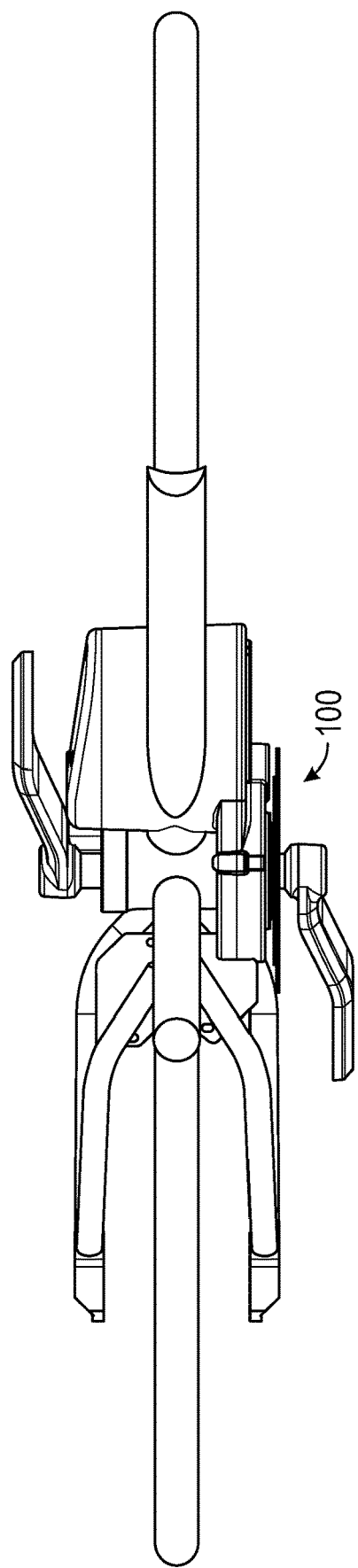
FIG. 1D is a top plan view of the vehicle of FIG. 1A.

FIG. 1A illustrates a perspective view of an embodiment of a vehicle including a pedal assembly and a mid-drive unit including a motor configured to provide motive power to the vehicle. FIG. 1B is a right side view of the vehicle of FIG. 1A. FIG. 1C is a left side view of the vehicle of FIG. 1A. FIG. 1D is a top plan view of the vehicle of FIG. 1A.

In the illustrated embodiment, the vehicle 10 comprises a bicycle comprising a front wheel 20, a rear wheel 30, and a frame 40. The frame 400 may include, among other components, a down tube 42 and a seat tube 44. A gearbox 100 may be located within the region at which the down tube 42 or its axial projection intersects the seat tube 44 or its axial projection. A bottom bracket, not visible in FIG. 1A, may be located at the intersection of the down tube 42 and the seat tube 44. A bottom bracket shaft 130 extends through the bottom bracket and is connected at each end to a pedal crank 134 supporting a pedal 50 at its outer end. The gearbox 100 may include a chain wheel 144 connected via a chain 60 to a sprocket or cogset of the rear wheel 30, allowing the rear wheel 30 to be driven by power transmitted through the chain. The rear wheel 30 in such an arrangement can also be referred to herein as a driven wheel. In some variants, the front wheel 20 is the driven wheel.

As described in greater detail herein, a motor assembly within a gearbox, such as gearbox 100, and a pedal assembly, such as the cranks 134 and pedals 50, can be used to deliver power to a driven wheel of a vehicle, such as the rear wheel 30 of vehicle 10. The power may be delivered along at least partially separate power paths passing through the gearbox 100, where the power paths can converge into a common output segment at a component within the gearbox 100. Upward of that common output segment, the separate sections of the power paths can be isolated from one another by respective one-way bearings located along each power path.

Figure 2A:
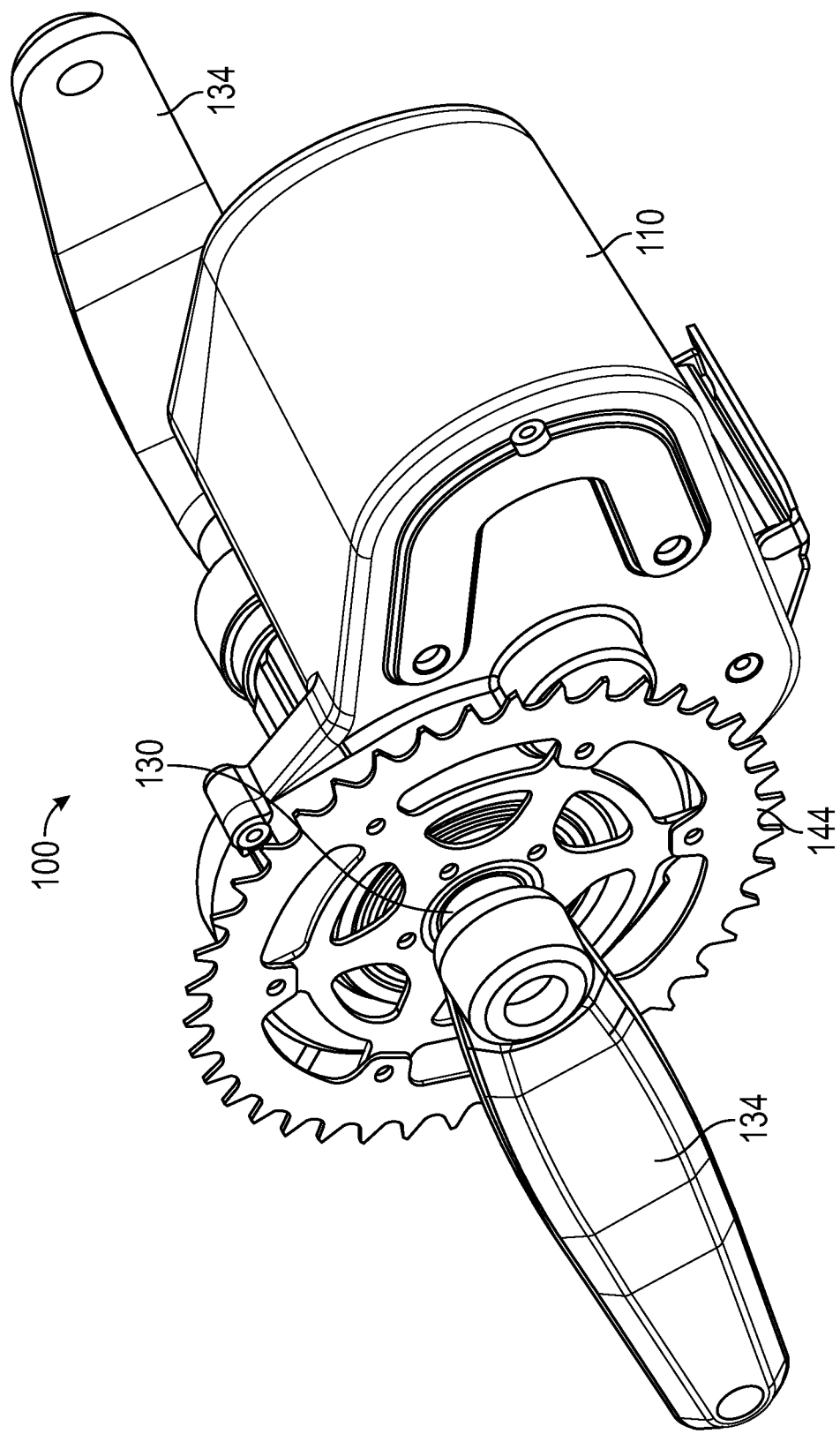
FIG. 2A illustrates a perspective view of a gearbox of the vehicle of FIG. 1A, shown independent of the vehicle.
Figure 2B:
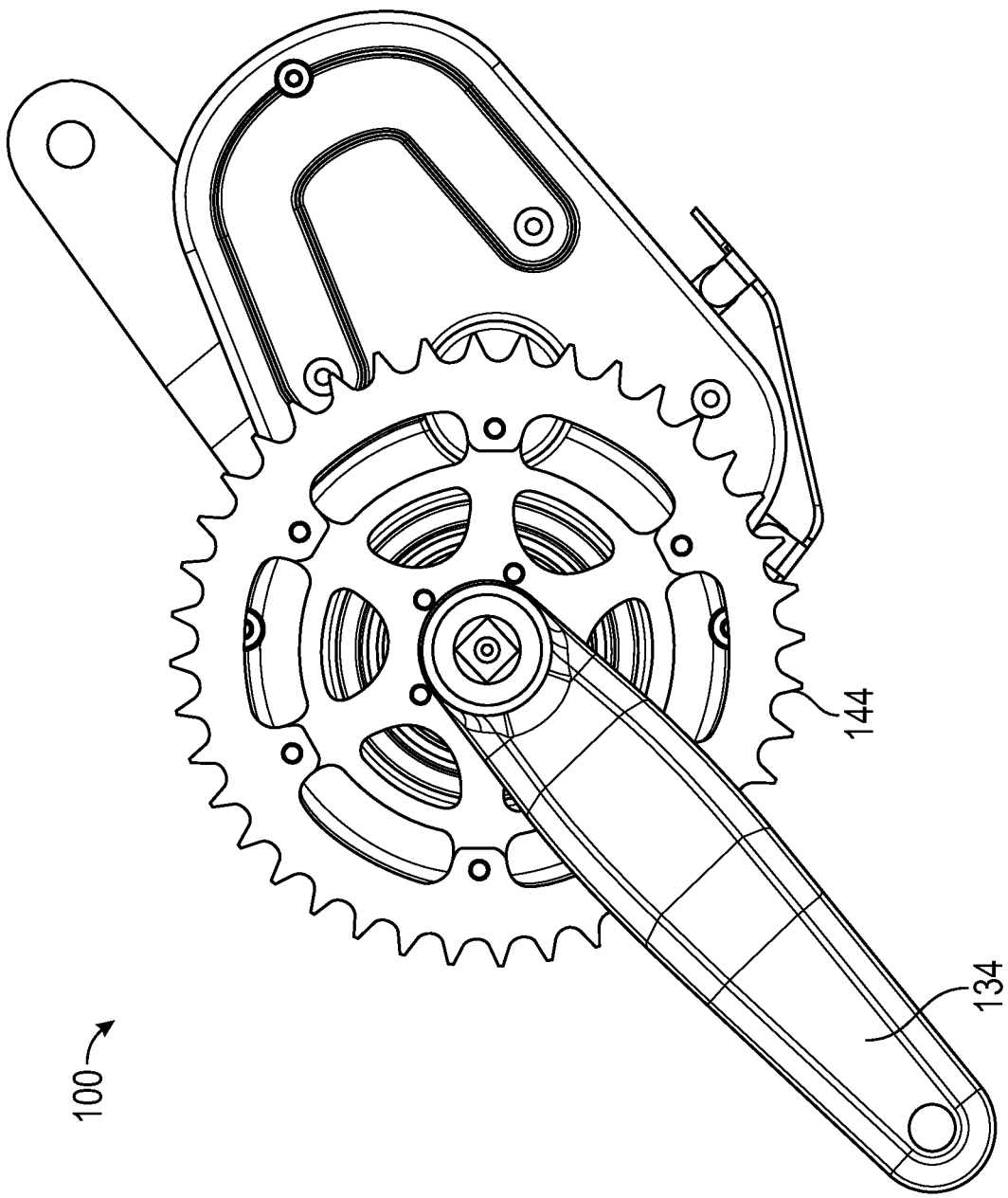
FIG. 2B illustrates a right side view of the gearbox of FIG. 2A.
Figure 2C:
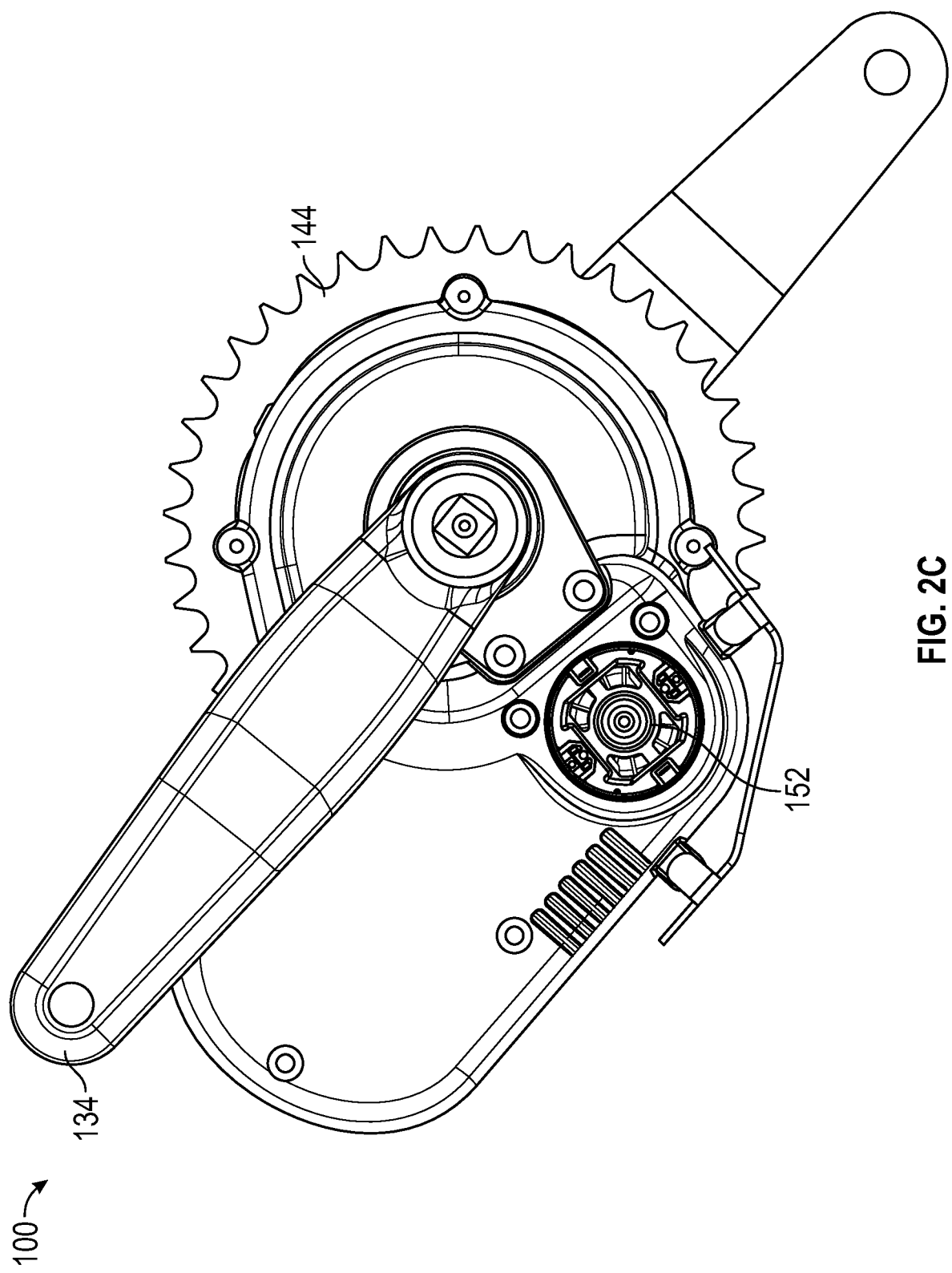
FIG. 2C illustrates a left side view of the gearbox of FIG. 2A.

FIG. 2A illustrates a perspective view of a gearbox of the vehicle of FIG. 1A, shown independent of the vehicle. FIG. 2B illustrates a right side view of the gearbox of FIG. 2A. FIG. 2C illustrates a left side view of the gearbox of FIG. 2A. The gearbox 100 may include a housing 110 enclosing a plurality of components arranged along multiple axes of rotation. The housing 110 can be plastic and/or metal, such as die cast metal, and may be dimensioned to be insertable or otherwise extend into a space between components of a vehicle frame.

As discussed in greater detail elsewhere herein, the housing 110 can be secured relative to the frame of the vehicle. For example, in some embodiments, the gearbox 100 is assembled on the vehicle frame through a crank axle. In some embodiments, the gearbox 100 can be assembled in a different manner. For example, the gearbox 100 can be attached to a bracket and/or frame of the vehicle, such as with screws or other fasteners. The gearbox 100 can be welded to or bolted on to a vehicle frame or an intermediate component, or may be built as an integral component of the vehicle, or otherwise connected to the vehicle frame in any suitable manner.

Figure 3A:
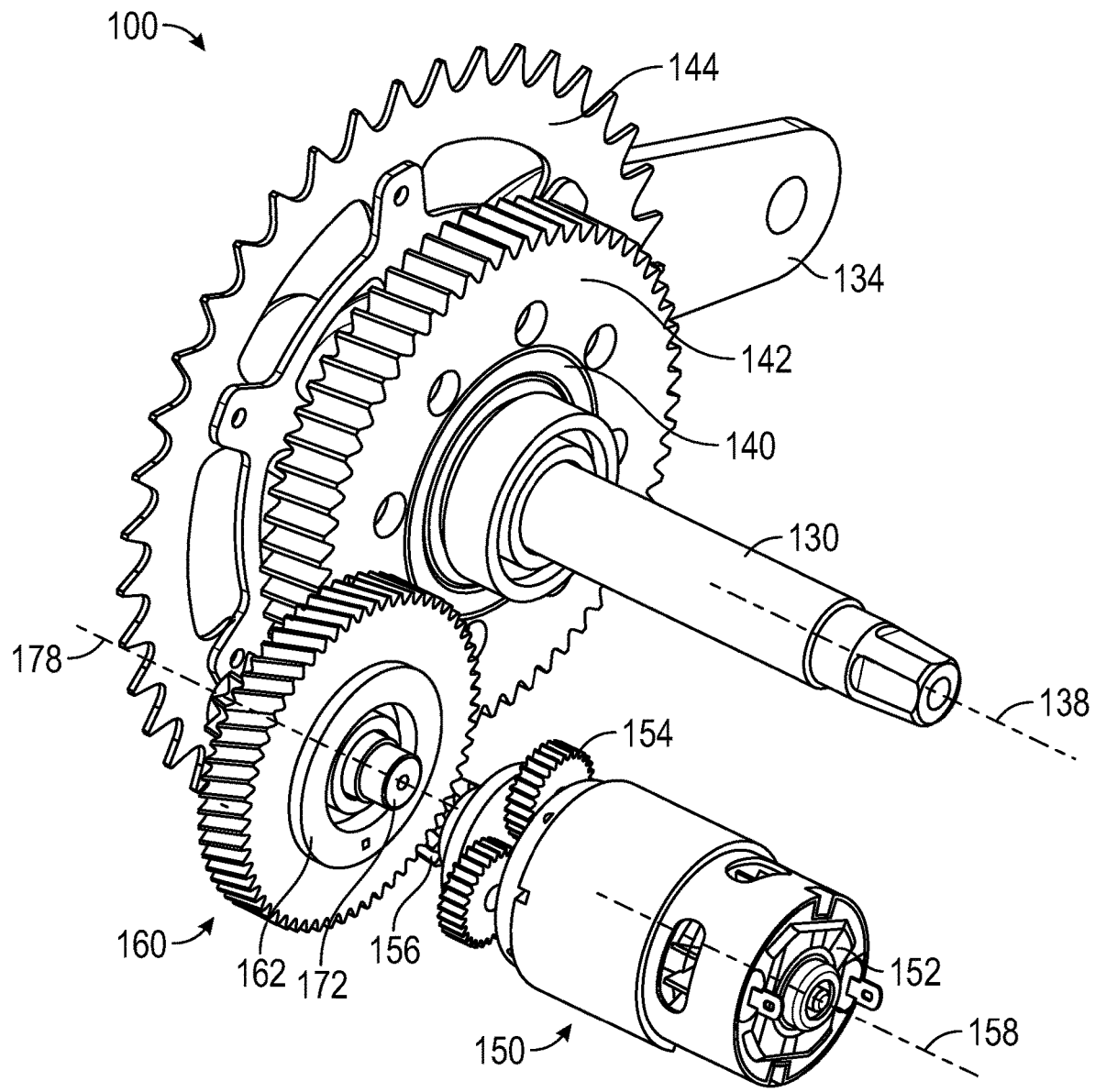
FIG. 3A illustrates a perspective view of certain components of the gearbox of FIG. 2A, shown with the housing and certain additional components removed.
Figure 3B:
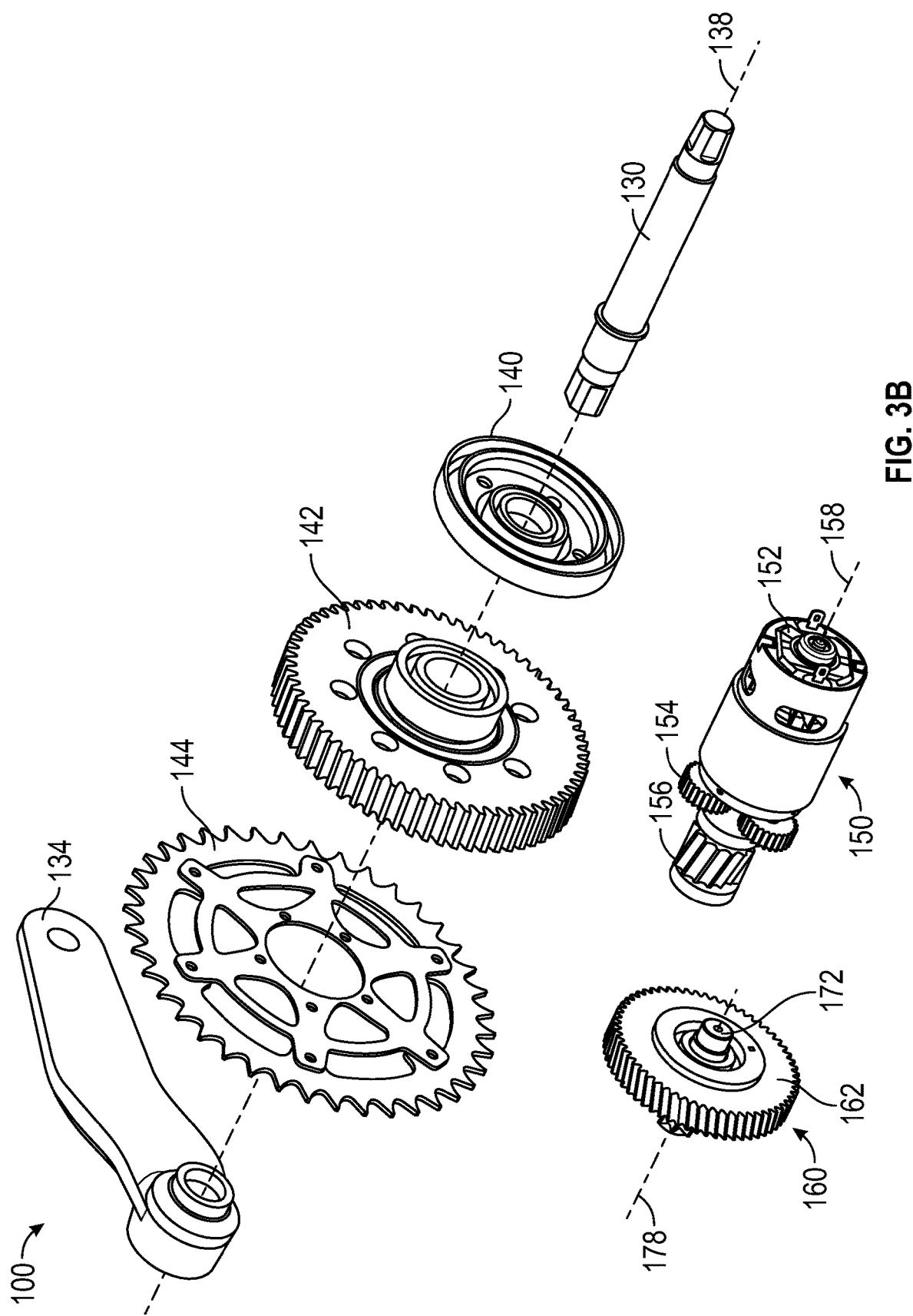
FIG. 3B illustrates an exploded assembly view of the gearbox components of FIG. 3A.
Figure 4A:
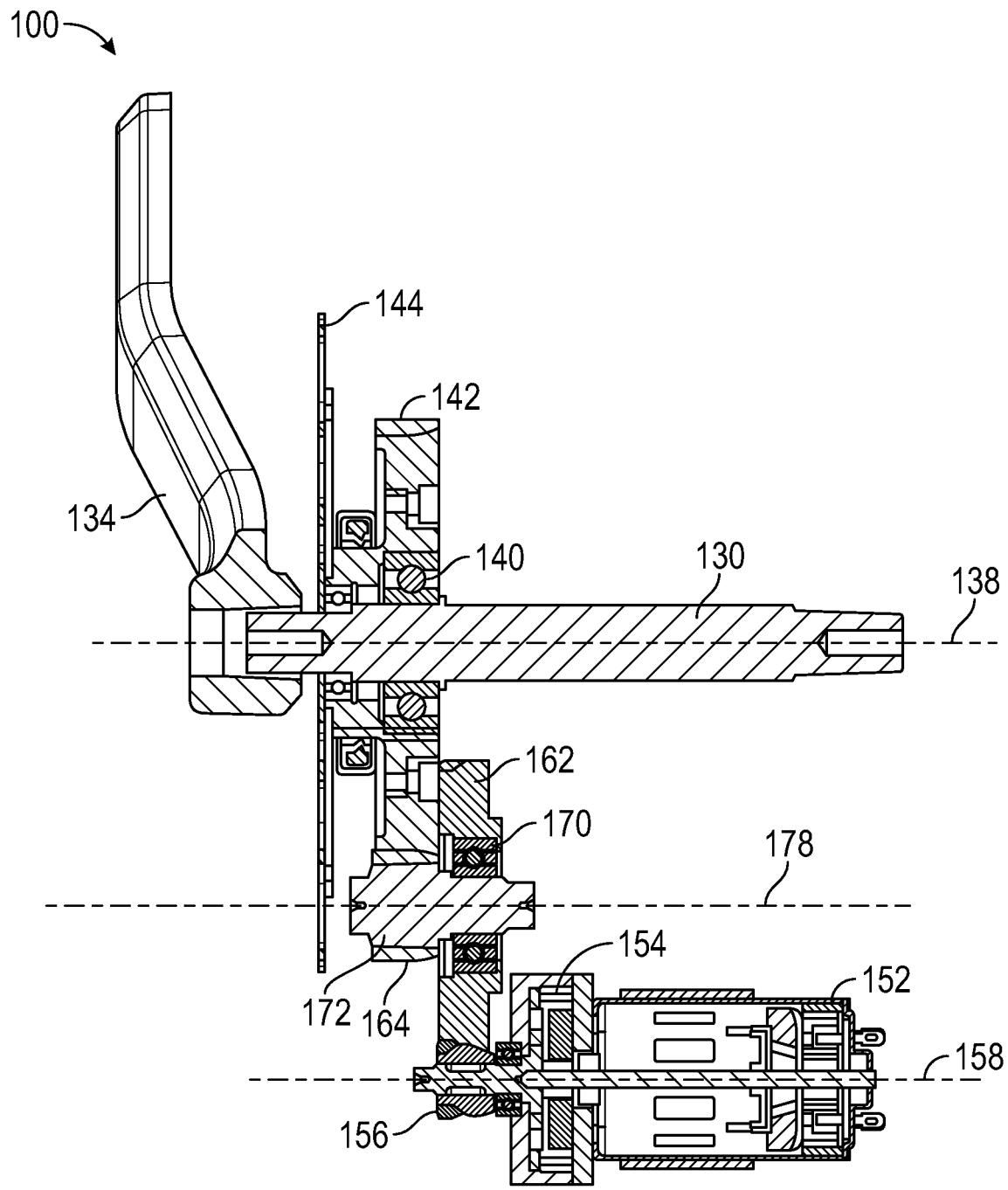
FIG. 4A illustrates a cross-sectional view of the components of FIG. 3A, with the components moved relative to one another so that the axes of each rotary shaft are coplanar with one another.
Figure 4B:
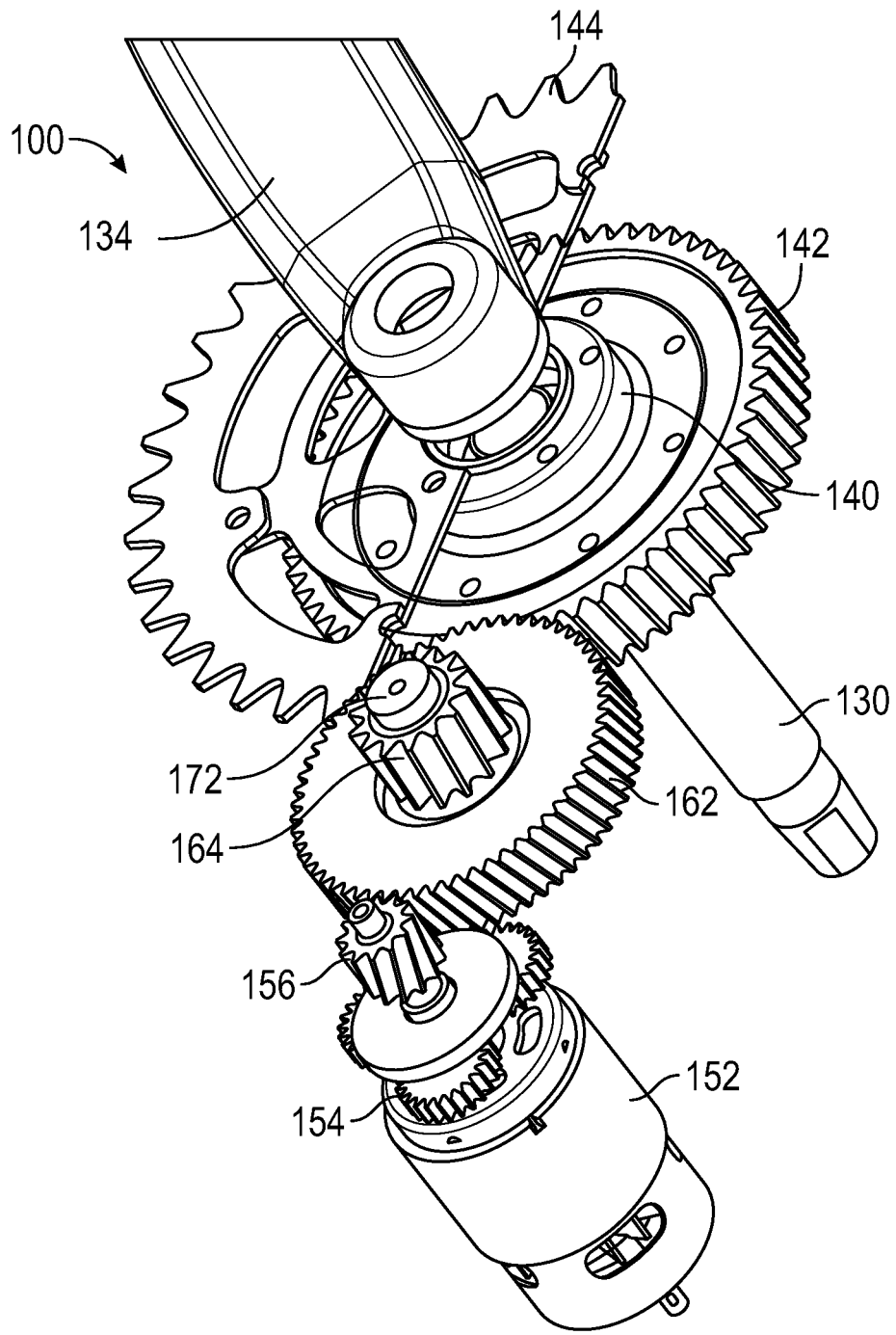
FIG. 4B illustrates a perspective view of the components of FIG. 3A, arranged as illustrated in FIG. 4A.
Figure 6A:
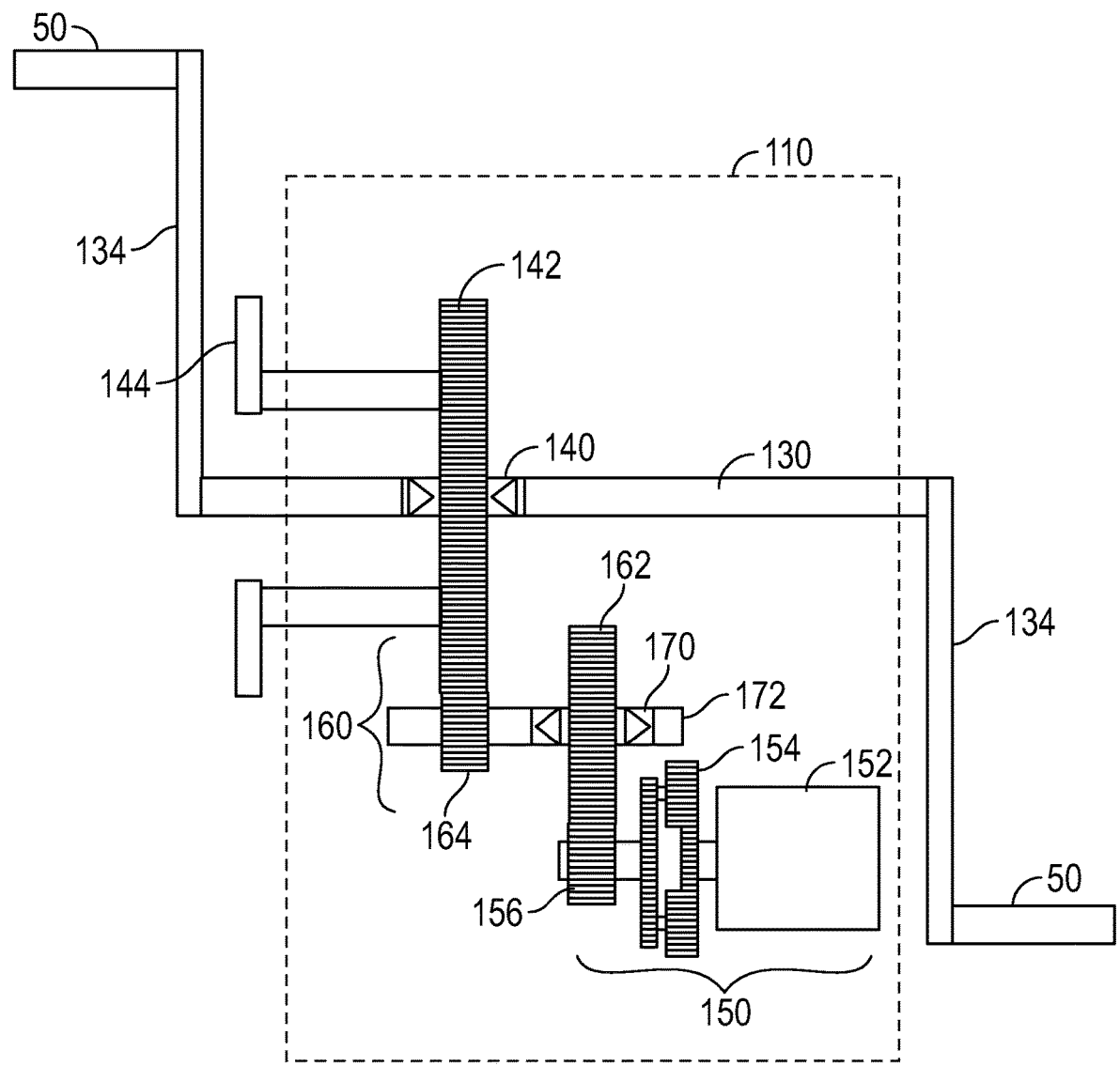
FIG. 6A is a schematic illustration of the components of the gearbox of FIG. 2A.

FIG. 3A illustrates a perspective view of certain components of the gearbox of FIG. 2A, shown with the housing and certain additional components removed. FIG. 3B illustrates an exploded assembly view of the gearbox components of FIG. 3A. FIG. 4A illustrates a cross-sectional view of the components of FIG. 3A, with the components moved relative to one another so that the axes of each rotary shaft are coplanar with one another. FIG. 4B illustrates a perspective view of the components of FIG. 3A, arranged as illustrated in FIG. 4A. FIG. 6A is a schematic illustration of the components of the gearbox of FIG. 2A.

As can be seen in, for example, FIG. 4A, the gearbox 100 includes a bottom bracket shaft 130, configured to rotate around a first rotational axis 138. The bottom bracket shaft 130 may be operably connected at each end to the cranks 134 of a pedal assembly, allowing a crank 134 of the pedal assembly to be rotated in a first direction to drive rotation of the coupled bottom bracket shaft 130 about the first rotational axis 138.

A first one-way bearing 140, also referred to herein as a pedal one-way bearing 140, is coaxial with both the bottom bracket shaft 130 and an output gear 142. A chain wheel 144, which may be integral with or otherwise rotationally fixed relative to the output gear 142, is also coaxial with the pedal one-way bearing 140. The bottom bracket shaft 130 extends through or is otherwise secured to the inner race of the pedal one-way bearing 140, so that rotation of the primary shaft around the first rotational axis 138 causes the inner race of the pedal one-way bearing to rotate around the first rotational axis 138.

The pedal one-way bearing 140 is configured to transmit torque between the bottom bracket shaft 130 and the output gear 142 when the crank 134 of the pedal assembly is driven in a first direction. Driving the inner race of the pedal one-way bearing 140 in the first direction locks the inner race of the pedal one-way bearing 140 relative to its outer race, allowing the transmission of torque therebetween.

Figure 6B:
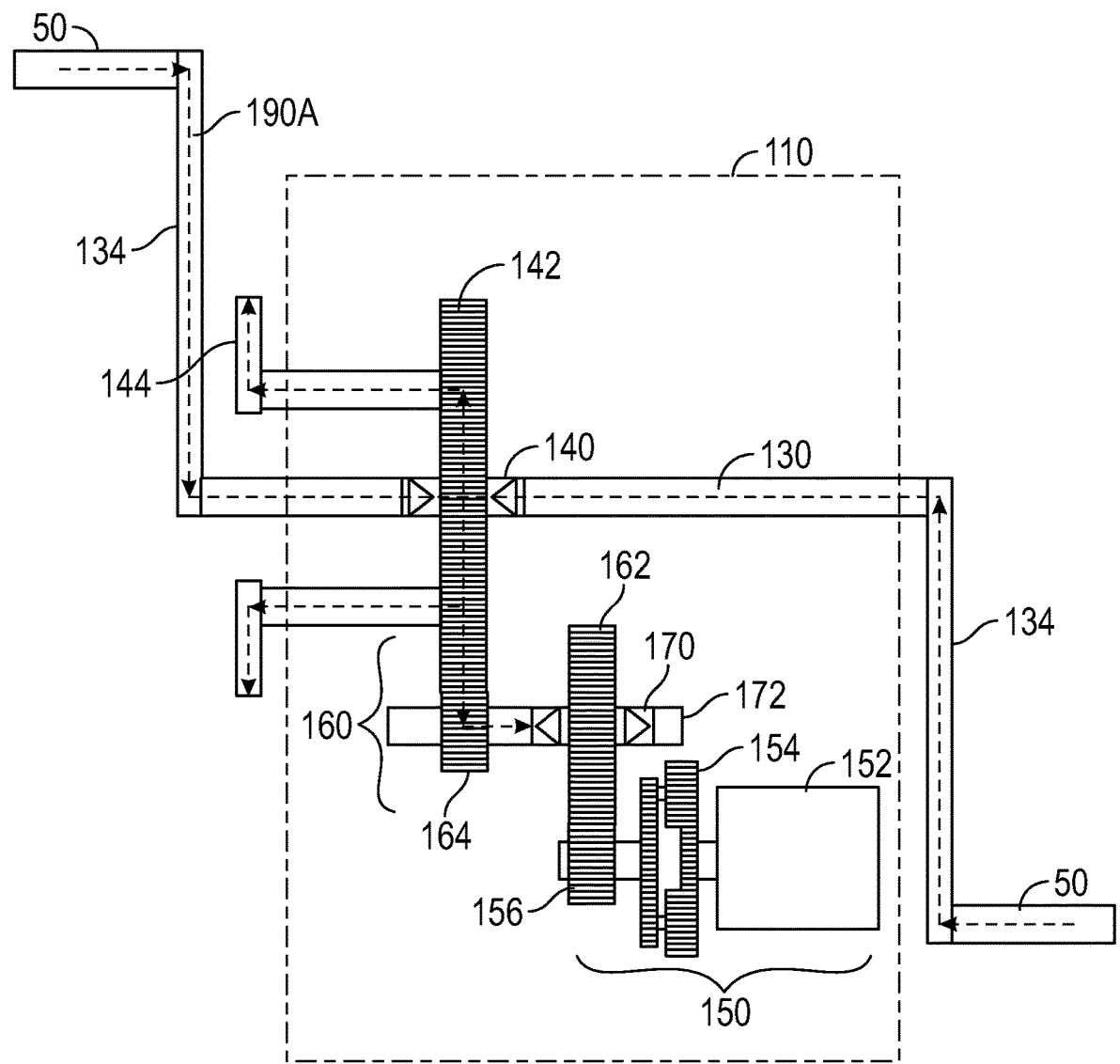
FIG. 6B is the schematic illustration of FIG. 6A, with a power path shown for motive power provided via the pedal assembly.

The first direction may be a forward direction, in which the crank 134 is moved so that the crank 134 moves around a circular path which includes movement of the crank 134 from upward vertical direction to a forward-facing direction, in the direction of travel of the vehicle or towards a front wheel of the vehicle. The torque transmission from the pedal one-way bearing 140 moves the output gear 142 and the rotationally coupled chain wheel 144 in the first direction. The rotation of the chain wheel 144 can drive rotation of a chain around the chain wheel 144, in turn driving a gear on a drive wheel to drive the vehicle. This power path is illustrated as power path 190A in FIG. 6B.

However, when the output gear 142 is being driven in the first direction by other means, without application of a moment to the bottom bracket shaft 130 via the crank 134, the movement of the outer race of the pedal one-way bearing 140 coupled to the output gear 142 will not induce moment of the inner race of the pedal one-way bearing 140. Driving of the output gear 142 in the first direction will allow the outer race of the pedal one-way bearing 140 to slip relative to its inner race, and will not transfer torque through the pedal one-way bearing 140 to the bottom bracket shaft 130. The pedal one-way bearing provides a conditional rotational coupling between the bottom bracket shaft 130 and the output gear 142, as relative movement in one direction between the inner race and the outer race of the pedal one-way bearing 140 causes the pedal one-way bearing 140 to lock and provide rotational coupling. Relative movement in the other direction permits the pedal one-way bearing 140 to slip, providing no rotational coupling.

Any suitable one-way bearing can be used, including sprag bearings, or bearings with intermediate ball bearings or other bearing members, such as needle bearings, being biased within an asymmetrical retaining space.

The gearbox 100 can include a motor assembly 150 which can be used to provide motive power to the vehicle, either in place of or in addition to pedaling motive power applied via the crank 134. The motor assembly 150 may include a motor 152 and an output rotational element 156. Depending on the speed of the motor 152, the motor assembly 150 can also include a step-down component, such as a planetary gear system 154. The planetary gear system 154 can include a sun gear which can be directly driven by the motor, and a plurality of planet gears driven in turn by the sun gear. The output rotational element 156 may be coupled in turn to the plurality of planet gears, so that the output rotation element 156 can be driven at a slower angular velocity than the sun gear and the motor 152, and the torque output of the overall motor assembly 150 can be increased relative to that of the motor 152 without the reduction of the planetary gear system 154. In some variants, the step-down component comprises a gear train (e.g., a plurality of spur gears), belt drive, chain drive, etc.

The motor 152 and the output rotational element 156 are coaxial with one another and are rotatable about a second rotational axis 158. In the illustrated embodiment, the output rotational element 156 comprises an output gear 156, allowing the motor assembly to drive rotation of an axially offset element. In other embodiments, however, the output rotational element 156 may be a shaft which can be coupled, for example, to another axially-aligned element.

In the illustrated embodiment, the planetary gear system 154 is depicted as a discrete element attached to the motor 152, although in other embodiments, a planetary gear system or other step-down component may be integrated into a housing of the motor 152 itself.

The motor assembly 150 is coupled to an intermediate step gear set 160, which includes a lower step gear 162 and an upper step gear 164. In some embodiments, the lower step gear 162 engages the motor output gear 156 of the motor assembly 100 and/or has a larger effective radius than the effective radius of the upper step gear 164. The lower step gear 162 is conditionally rotationally coupled to the upper step gear 164 via a second one-way bearing 170, also referred to as a motor one-way bearing 170, and a step gear shaft 172 rotationally fixed to the upper step gear 164. The step gear shaft 172 is rotationally coupled to the inner race of the motor one-way bearing 170, and the upper step gear 164 is rotationally coupled to the outer race of the motor one-way bearing 170. Each of the lower step gear 162, the upper step gear 164, the motor one-way bearing 170, and the step gear shaft 172 can be coaxial with and configured to rotate around a third rotational axis 178.

Figure 6C:
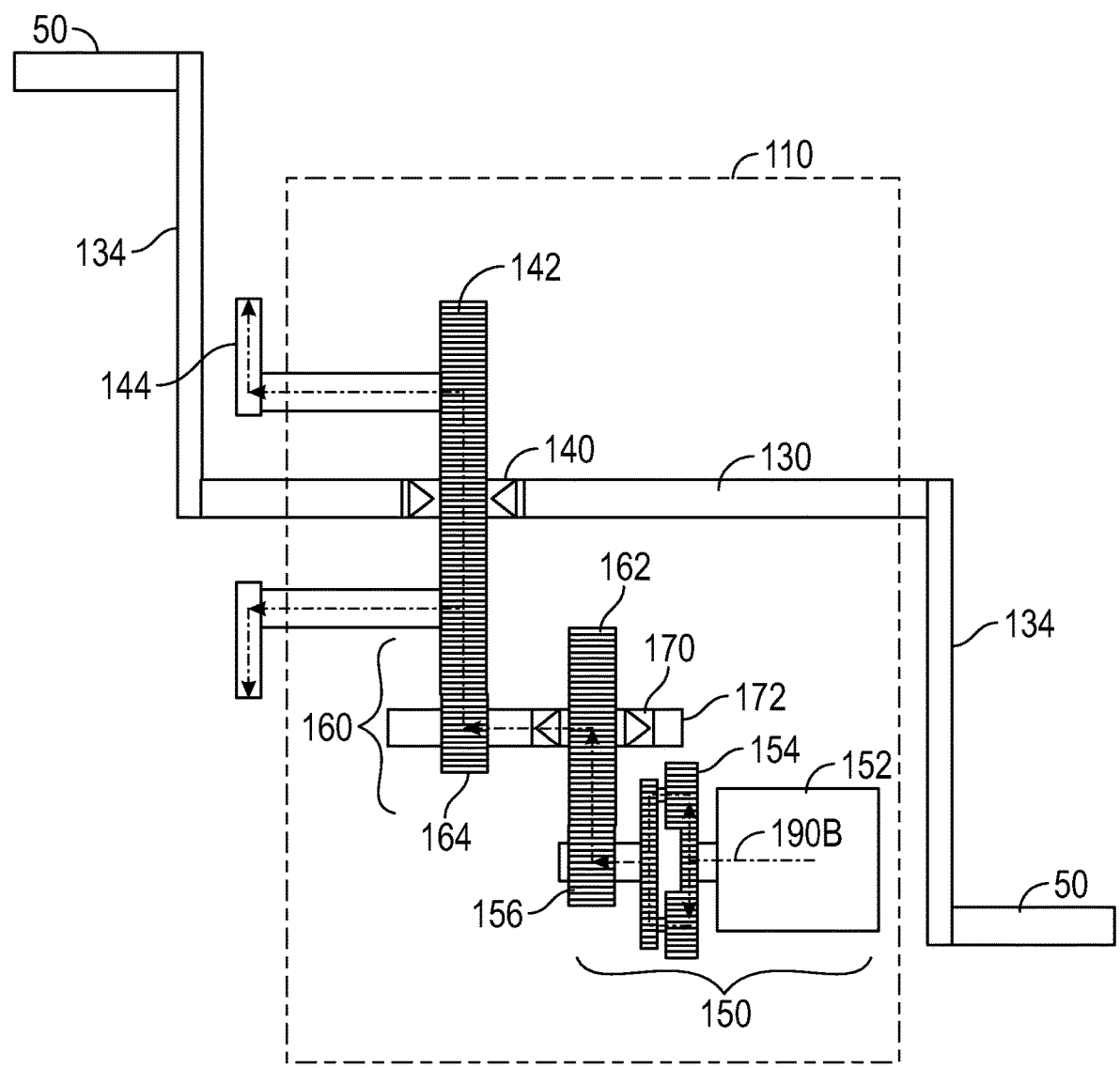
FIG. 6C is the schematic illustration of FIG. 6A, with a power path shown for motive power provided via the motor assembly.
Figure 6D:
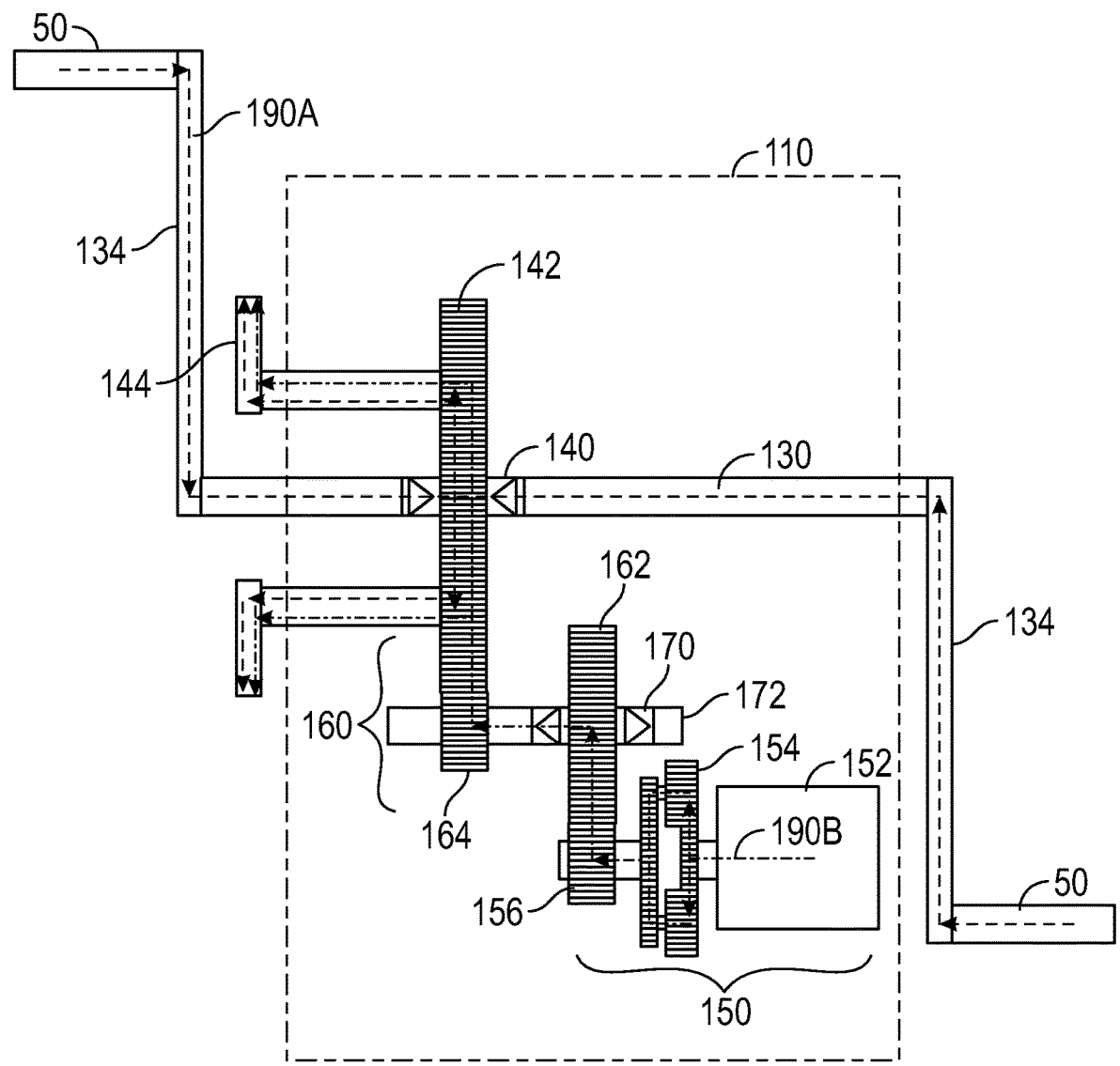
FIG. 6D is the schematic illustration of FIG. 6A, with combined power paths shown for motive power simultaneously provided via both the pedal assembly and the motor assembly.

When the motor assembly 150, and in particular the output gear 156, are driven in the first direction, the lower step gear 162 will be driven in a second direction opposite the first direction. In turn, the outer race of the motor one-way bearing 170 will be driven in the second direction. The motor one-way bearing 170 is oriented such that, when the outer race is driven in the second direction, the motor one-way bearing locks and torque is transmitted to the inner race of the motor one-way bearing 170 to the step gear shaft 172 and the upper step gear 164. Thus, due to the orientation of the motor one-way bearing 170, driving the lower step gear 162 to rotate in the second direction causes each of the components of the intermediate step gear set 160 is driven together in the second direction as a single unit. In turn, the rotation of the upper step gear 164 in the second direction causes the rotation of the output gear 142 and the rotationally coupled chain wheel 144 in the first direction, and the chain can in turn drive the vehicle in the same forward direction as rotation of the pedal crank 134 in the first direction. This power path is illustrated as power path 190B in FIG. 6C.

When the output gear 142 is being driven in the first direction without the use of the motor assembly 150, such as by rotation of the pedal crank 134, the upper step gear 164 and the step gear shaft 172 will be driven in the second direction. However, due to the orientation of the motor one-way bearing 170, the rotation of the inner race of the motor one-way bearing 170 will not induce rotation of the outer race of the motor one-way bearing 170, and substantially no torque will be transferred from the step gear shaft 172 to the lower step gear 162.

The motor one-way bearing 170 isolates (e.g., disconnects) the motor assembly 150 from pedal-driven operation of the vehicle, when the motor assembly 150 is not being used to provide motive power to the vehicle. This inhibits or prevents, for example, the motor assembly 150 from negatively impacting pedal-driven operation of the vehicle, as would occur due to the frictional load which would be caused if rotation of the pedal crank 134 induced rotation of a rotor of the motor 152 relative to a stator of the motor 152.

In the illustrated embodiment, the motor one-way bearing 170 is located within the lower step gear 162, with the outer race of the motor one-way bearing 170 coupled to the lower step gear 162. In other embodiments, however, the one-way bearing may be located elsewhere on the power path between the motor 152 and the output gear 142. For example, the upper step gear 164 may be connected to the outer race of the motor one-way bearing 170, and the lower step gear 162 rotationally coupled via the step gear shaft 172 to the inner race of the motor one-way bearing 170. In other embodiments, such as embodiments in which less gear reduction is provided between the motor 152 and the output gear 142, a race of the motor one-way bearing 170 may be directly connected to an output rotational element 156 of the motor assembly 150.

Similar to the isolation provided by the motor one-way bearing 170, the pedal one-way bearing 140 can isolate the pedal crank 134 from motor-driven operation of the vehicle. This can enable the pedals supported by the pedal cranks 134 can remain stationary during purely motor-driven operation of the vehicle. This allows a rider to rest their feet in a stable position during motor-driven operation.

If both the motor assembly 150 and the pedal cranks 134 are used simultaneously to provide motive power to the vehicle, the pedal one-way bearing 140 and the motor one-way bearing 170 can allow torque to be transmitted to the output gear 142 simultaneously from both the motor assembly 150 and the pedal cranks 134. This allows the vehicle to be operated in a motor-assisted mode, where a rider can use the motor assembly 150 to provide supplemental motive power to the vehicle while pedaling.

The motor can be controlled in various ways. In some embodiments, the motor is controlled with a throttle, such as a thumb throttle, that the user can adjust. In some implementations, the motor provides drive assistance to the user. For example, the motor can provide motive force that supplements or adds to motive force provided by the user via the pedals. In some embodiments, the motor provides motive force when the user is not pedaling. In certain variants, the motor provides motive force when the user is pedaling. In certain implementations, the bike includes a sensor, such as a torque, proximity, or other sensor, that is used in control of the motor. For example, the motor can be actuated when a threshold torque level is detected and/or exceeded. This can enable automatic locomotion assistance by the motor and/or can permit a user to control operation of the motor by use of the pedal assembly, such as by applying an amount of torque to the pedal assembly that is greater than or equal to the threshold. In various embodiments, the bike can be concurrently powered by the motor and by the user via the pedal assembly.

Figure 5:
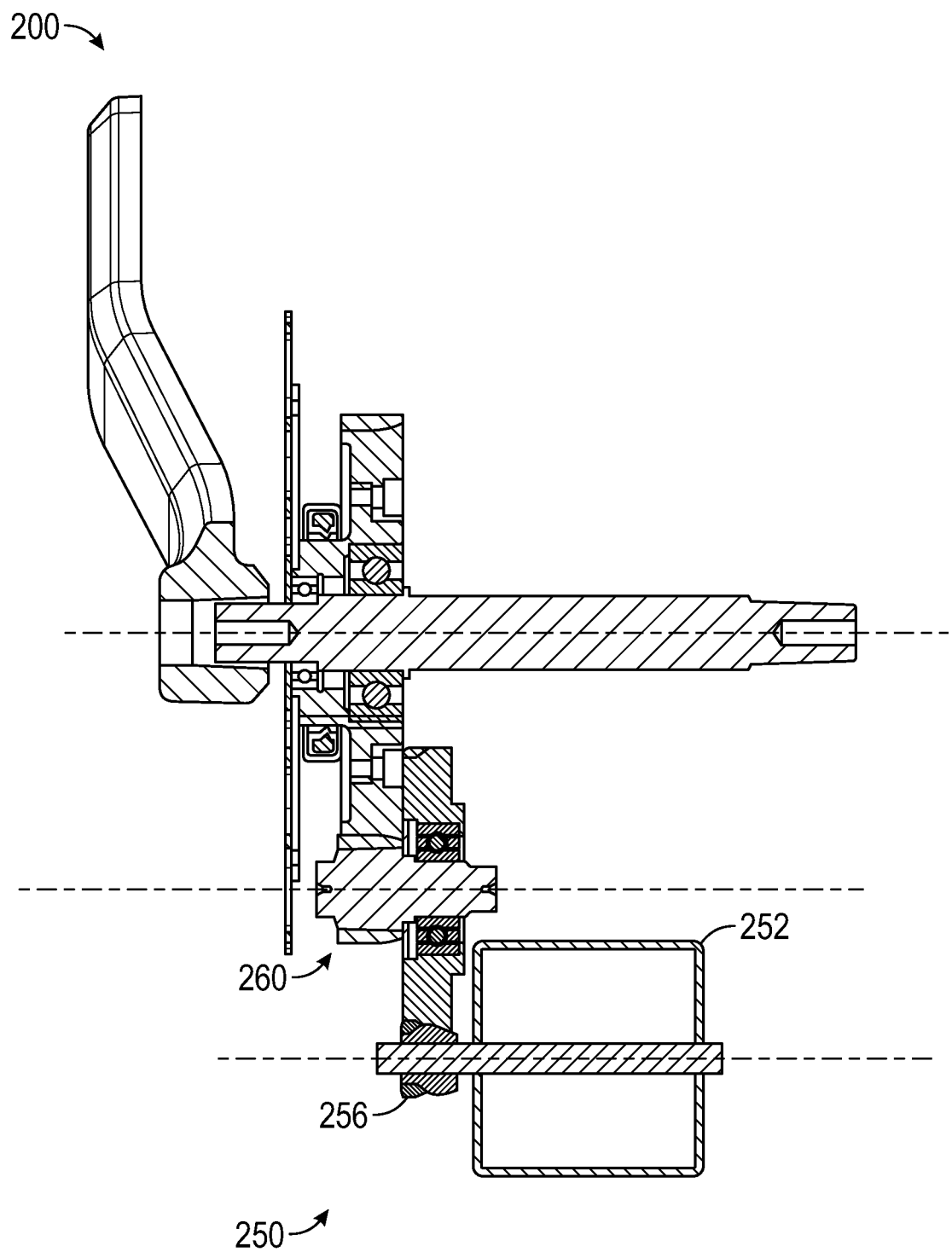
FIG. 5 illustrates a cross-sectional view of the components of an alternative embodiment of a gearbox without a planetary gear set connected to the motor, arranged in the same position as FIG. 4A.

FIG. 5 illustrates a cross-sectional view of an alternative gearbox 200. The gearbox 200 can have a motor assembly 250. In some embodiments, the motor assembly 250 includes a direct drive and/or does not include a planetary gear set. The gearbox 200 is shown with the components arranged in the same relative positions as FIG. 4A. In such an embodiment, the motor 252 drives an output shaft 254 and a motor output gear 256 supported thereon at the same angular velocity as the motor 252. Such an arrangement may be suitable, for example, when the motor 252 is configured to rotate at a lower speed than the motor 152. For example, in some embodiments, the motor 252 may be configured to rotate at less than 4,000 RPM. In comparison, in some embodiments, the motor 152 which is used in conjunction with a planetary gear set 154 may be configured to rotate at more than 10,000 rpm. In some embodiments, the motor 152 may have an output angular velocity of roughly 18,000 rpm, although a wide range of motor output speeds can be accommodated with different gear ratios at each of the stages of the gearbox. For example, the ranges of suitable motor speeds for motors 152 and 252 may vary based upon the gear reduction provided by intermediate step gear sets 160 and 260, as well as any gear reduction which may be provided elsewhere in the power trains of gearboxes 100 and 200.

Figure 7A:
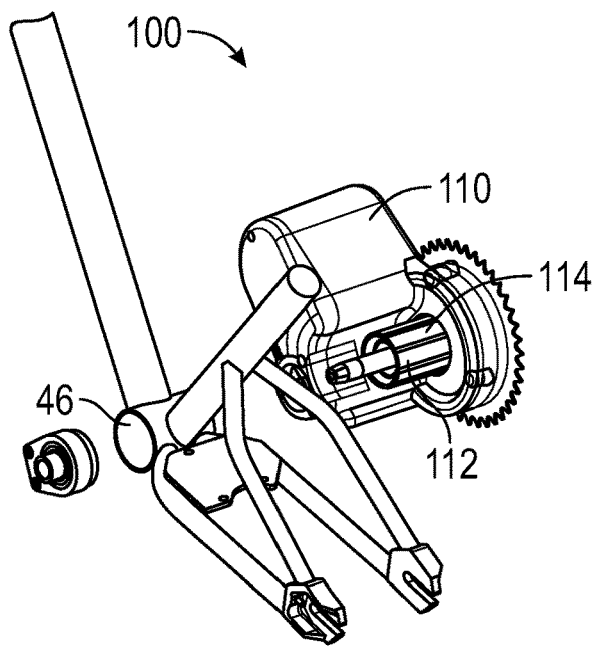
FIGS. 7A-7C are perspective views illustrating installation of the gearbox of FIG. 2A onto the vehicle of FIG. 1A.
Figure 7B:
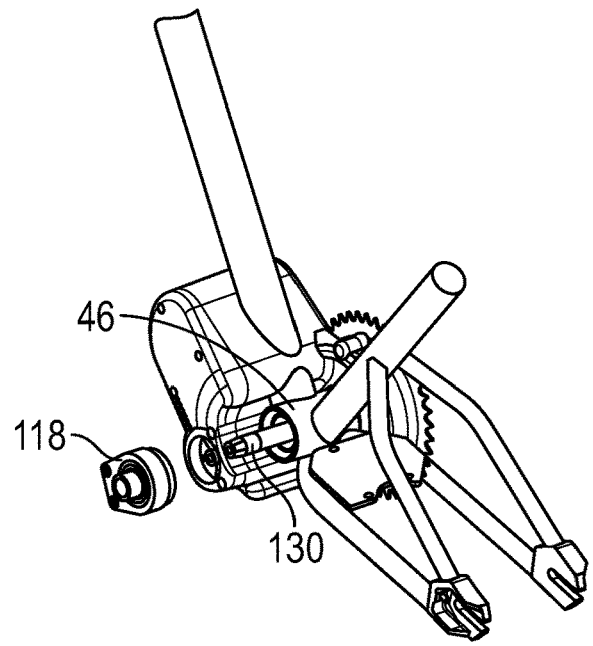
Figure 7C:
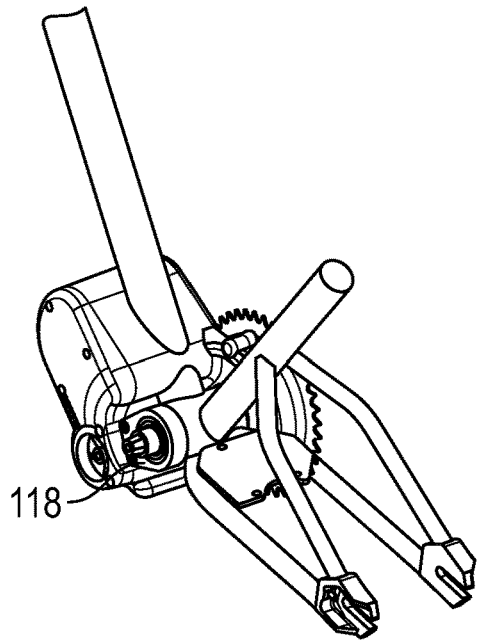

FIGS. 7A-7C are perspective views illustrating installation of the gearbox of FIG. 2A onto the vehicle of FIG. 1A. As can be seen in FIG. 7A, the housing 110 of the gearbox 100 may include a generally cylindrical engagement member 112 which is dimensioned to fit into a radially inner wall of the bottom bracket shell 46. The engagement member 112 may include a plurality of radially extending ribs or fins 114 which can abut the inside of the bottom bracket shell to provide a frictional fit therebetween. A leading edge of the fins 114 may be tapered to facilitate insertion into the bottom bracket shell 46.

As can be seen in FIG. 7B, once the engagement member 112 is fully inserted into the bottom bracket shell 46, a portion of the bottom bracket shaft 130 extends through the bottom bracket shell 46 and outward beyond the bottom bracket shell 46. A gearbox cover 118 may be inserted onto the exposed portion of the bottom bracket shaft 130 and slid toward the bottom bracket shell 46 to abut and/or extend at least partially into the bottom bracket shell 46. In some embodiments, the gearbox cover 118 may be retained in place at least in part via a frictional fit with the bottom bracket shell 46. The gearbox cover 118 may include one or more rotary bearings configured to support the bottom bracket shaft 130 at its free end and allow rotation of the bottom bracket shaft 130 relative to the bottom bracket shell 46.

In FIG. 7C, it can be seen that the gearbox cover 118 has been inserted into place, completing the installation of the gearbox 110 onto the vehicle frame 40. Pedal cranks 134 (see FIG. 1A) may be attached to each end of the bottom bracket shaft 130, and may cooperate with the frictional fit between the components to retain the gearbox 100 in place on the vehicle frame.

The axial installation of the gearbox 100 and/or an entire mid-drive unit can enable a quick and easy installation process. However, a wide variety of alternative installation processes may be used in conjunction with various gearbox and/or mid-drive unit designs. For example, in some embodiments, a gearbox can be installed from the bottom of the vehicle, such as by being moved vertically into a corresponding mating bracket in the frame of the vehicle. In some embodiments, a gearbox can be installed, at least partly, into the location at which the footpedal and/or crank mechanisms mount to the bike. In some embodiments, a gearbox can be installed without modifying the frame of the bike. The installation of a gearbox and/or mid-drive unit can facilitate converting and/or retrofitting of a non-powered bike into a powered bike.

In the gearbox 100, the output gear 142 is rotationally coupled to the chain wheel 144 and is configured to function as a torque-combining component at which both power paths converge, allowing the output gear 142 to receive torque from both the bottom bracket shaft 130 and the intermediate step gear set 160. In other embodiments, however, an output gear and a chain wheel can be rotationally independent of, but supported by, a bottom bracket, and an axially offset gear upstream in the power paths may serve as a torque-combining component.

FIG. 8

Figure 8:
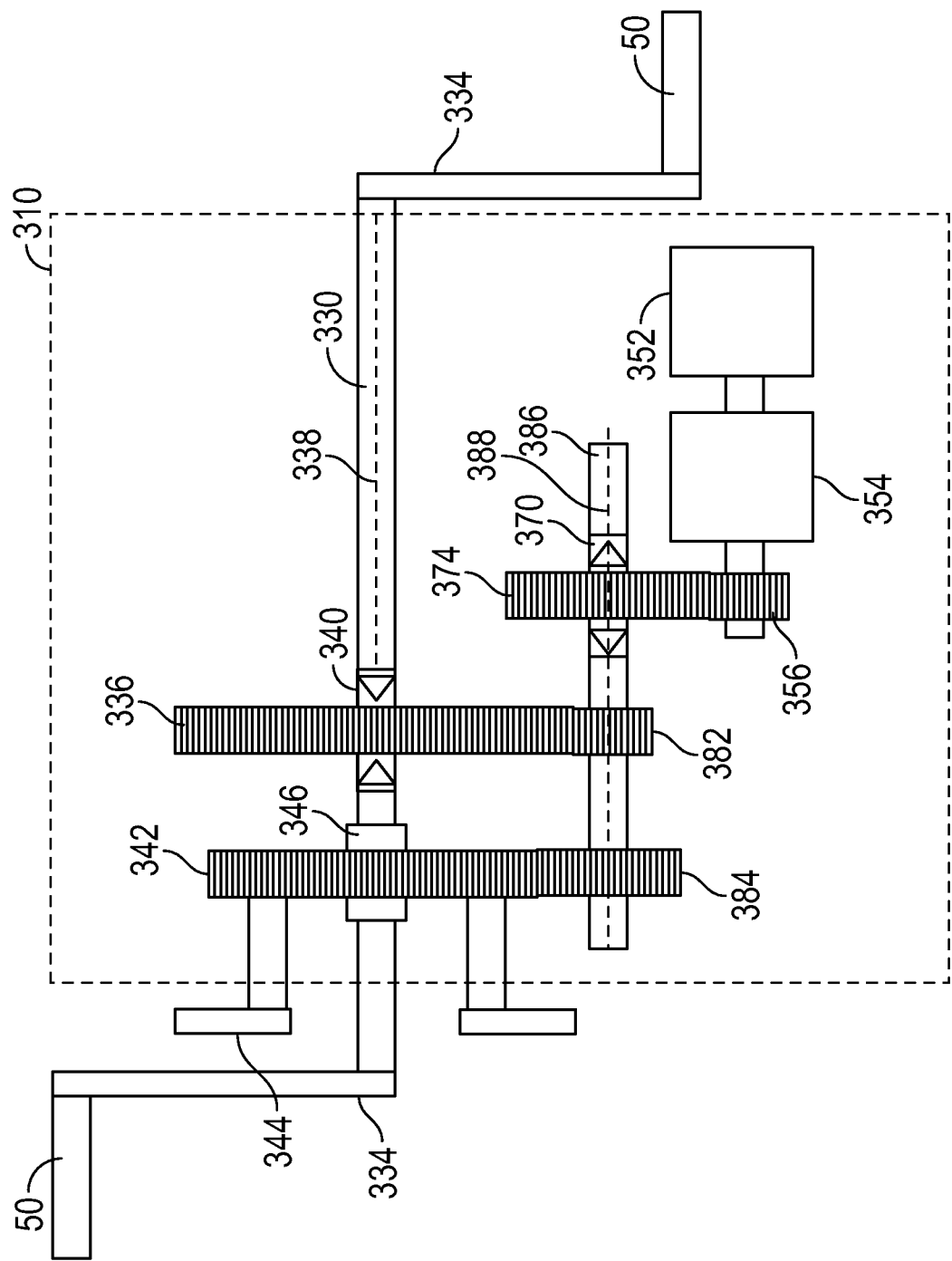
FIG. 8 is a schematic illustration of certain components of an alternative embodiment of a gearbox in which the power paths from the pedal assembly and the motor assembly converge at a component which is offset from the bottom bracket shaft.

FIG. 8 schematically illustrates certain components of an alternative embodiment of a gearbox in which the power paths from the pedal assembly and the motor assembly converge at a component which is offset from the bottom bracket shaft. FIG. 8 schematically illustrates an embodiment of a gearbox 300 comprising a torque-combining gear which is axially offset from the output gear. The gearbox 300 comprises a bottom bracket shaft 330 which is rotationally coupled to pedal cranks 334. A pedal one-way bearing 340, which may be concentrically positioned within a pedal output gear 336, provides conditional rotational coupling between the bottom bracket shaft 330 and the pedal output gear 336. When the pedal cranks 334 are driven in a first direction, such as by a user pedaling the vehicle, the pedal output gear 336 is driven in the first direction.

Rotation of the pedal output gear 336 in the first direction drives rotation of a first offset step gear 382, which serves as a torque-combining component, about an offset shaft 386 in a second direction opposite the first direction. A second offset step gear 384, which is rotationally connected to the first offset step gear 382, is driven in the same second direction as the first offset step gear 382. In turn, rotation of the second offset step gear 384 drives rotation of the output gear 342 and the rotationally-coupled chain wheel 344 in the first direction.

The output gear 342 can be supported by the bottom bracket shaft 330. In certain implementations, the output gear 342 is supported via a rotary bearing which does not transmit torque between the output gear 342 and the bottom bracket shaft 330. Instead, the rotary bearing supporting the output gear 342 does not directly couple rotation of the bottom bracket shaft 330 to rotation of the output gear 342. This allows the output gear 342, under certain conditions and in certain embodiments, to rotate relative to (e.g., at a different speed than) the bottom bracket shaft 330. Under certain conditions, the bottom bracket shaft 330 can remain stationary during rotation of the output gear 342.

In some implementations, each of the output gear 342 and its supporting rotary bearing and the pedal output gear 336 and its supporting pedal one-way bearing 340 are coaxial with the bottom bracket shaft 330. Each of these components, as well as the chain wheel 344 is configured to rotate around a first rotational axis 338. The first offset step gear 382 and the second offset step gear 384, as well as the offset shaft 386, are configured to rotate around an offset rotational axis 388. The power path from the pedal cranks 334 thus runs through the bottom bracket shaft, through the pedal one-way bearing 340 to the pedal output gear 336, through the first and second offset step gears 382 and 384, and to the output gear 342 and the chain wheel 344.

The gearbox 300 can includes a motor assembly, which includes a motor 352 and a reduction component 354. The reduction component 354 may be any suitable component or combination of components configured and arranged to provide an output angular velocity which is less than the angular velocity of the motor 352. The reduction component 354 may include one or more of planetary gear sets, worm gears, belts, step gears, or any combination of these or other suitable components.

The motor assembly can include or is connected to a motor one-way bearing (not specifically illustrated in FIG. 8), which mechanically isolates the motor assembly 350 from the pedal crank 334. The motor one-way bearing may be located at any suitable location along the power path between the motor 352 and the first offset step gear 382.

The motor assembly 350 and the reduction component 354 are configured to, when the motor 352 is driven, drive the first offset step gear 382 in the second direction. This also drives the second offset step gear 384 in the second direction, which in turn drives rotation of the output gear 342 and the rotationally-coupled chain wheel 344 in the first direction. In addition, however, the rotation of the first offset step gear 382 in the second direction drives rotation of the pedal output gear 336 in the first direction. The rotation of the pedal output gear 336 and the outer race of the pedal one-way bearing 340 in the first direction does not result in corresponding rotation of the inner race of the pedal one-way bearing 340. The output gear 342 is thus driven to rotate in the first direction by the motor 352, while the bottom bracket shaft 330 and the pedal cranks 334 connected to the bottom bracket shaft can remain stationary, as the torque generated by the motor 352 is not transmitted through the pedal one-way bearing 340 to the bottom bracket shaft 330. FIGS. 9A-14B FIG. 9A illustrates a perspective view of another embodiment of a vehicle 10' including a pedal assembly and an alternative embodiment of a mid-drive unit including a motor configured to provide motive power to the vehicle. FIG. 9B is a right side view of the vehicle of FIG. 9A. FIG. 9C is a left side view of the vehicle of FIG. 9A. FIG. 9D is a top plan view of the vehicle of FIG. 9A.

Figure 9A:
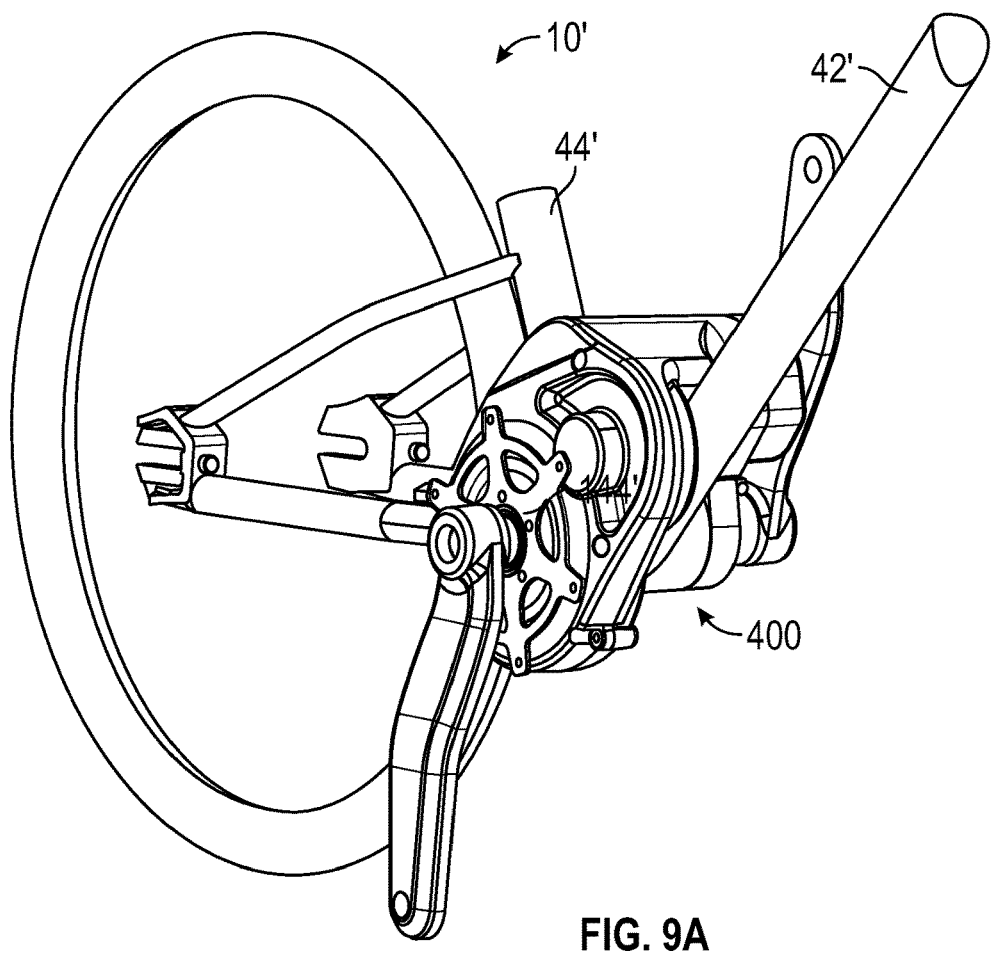
FIG. 9A illustrates a perspective view of another embodiment of a vehicle including a pedal assembly and an alternative embodiment of a mid-drive unit including a motor configured to provide motive power to the vehicle.
Figure 9B:
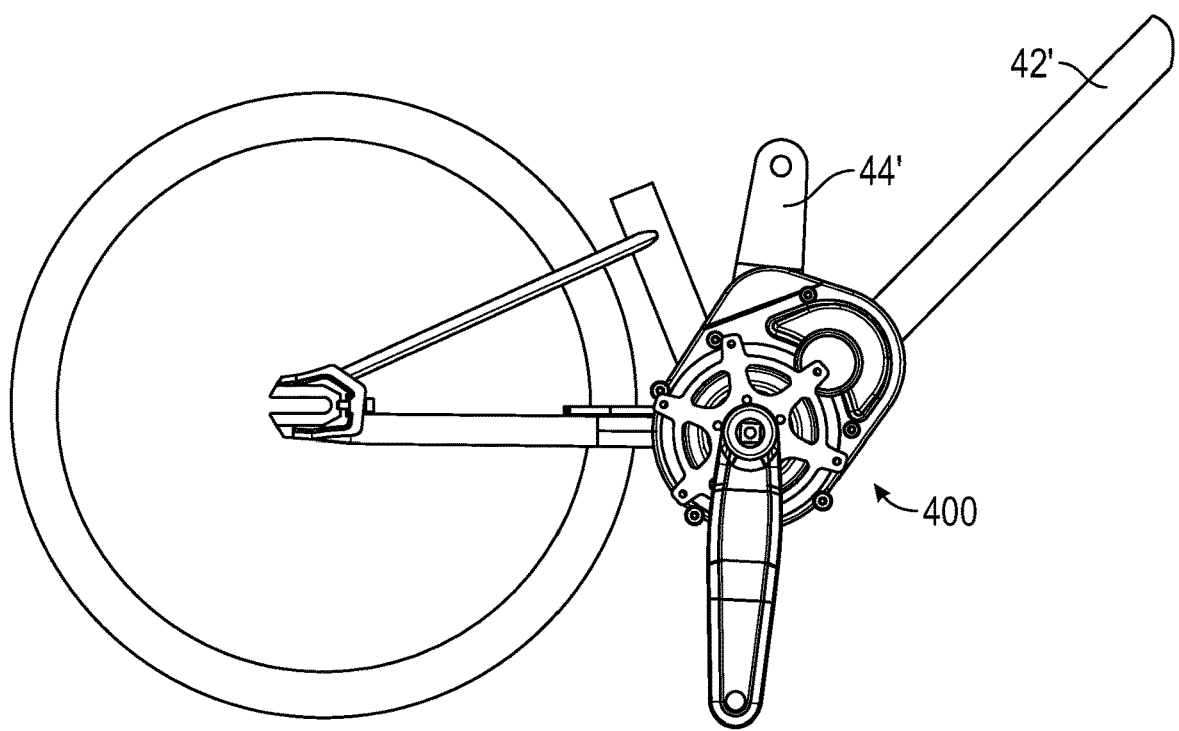
FIG. 9B is a right side view of the vehicle of FIG. 9A.
Figure 9C:
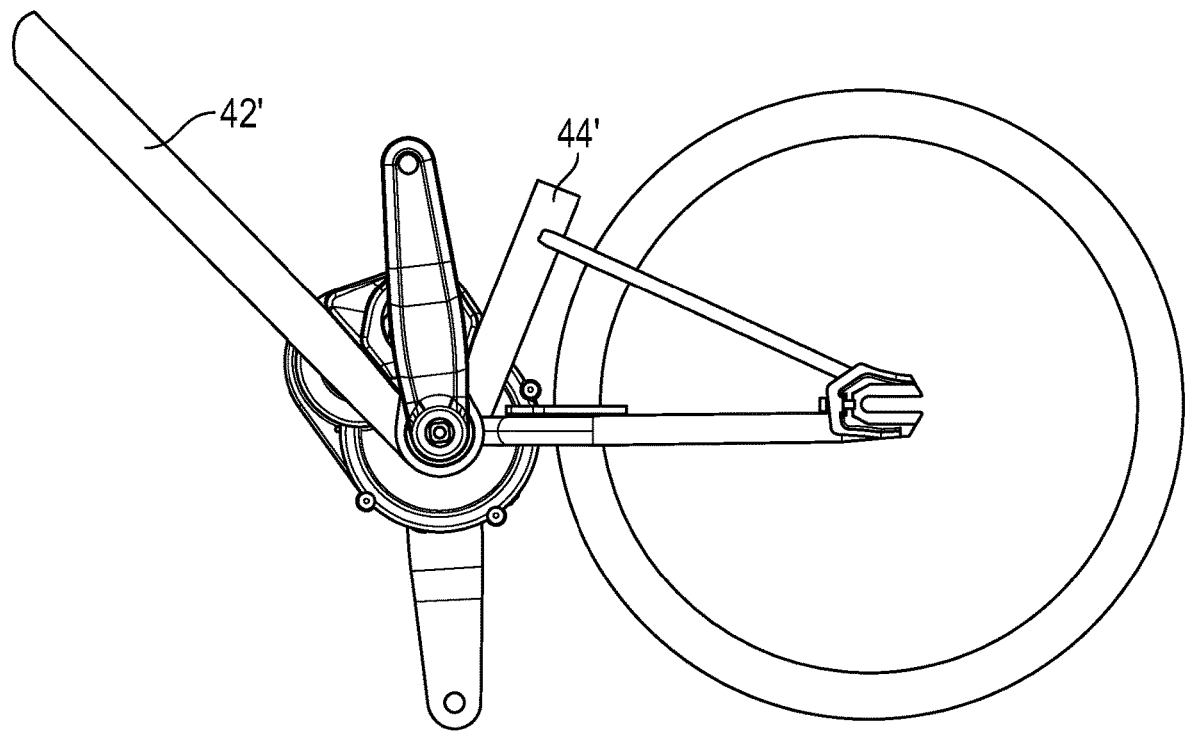
FIG. 9C is a left side view of the vehicle of FIG. 9A.
Figure 9D:
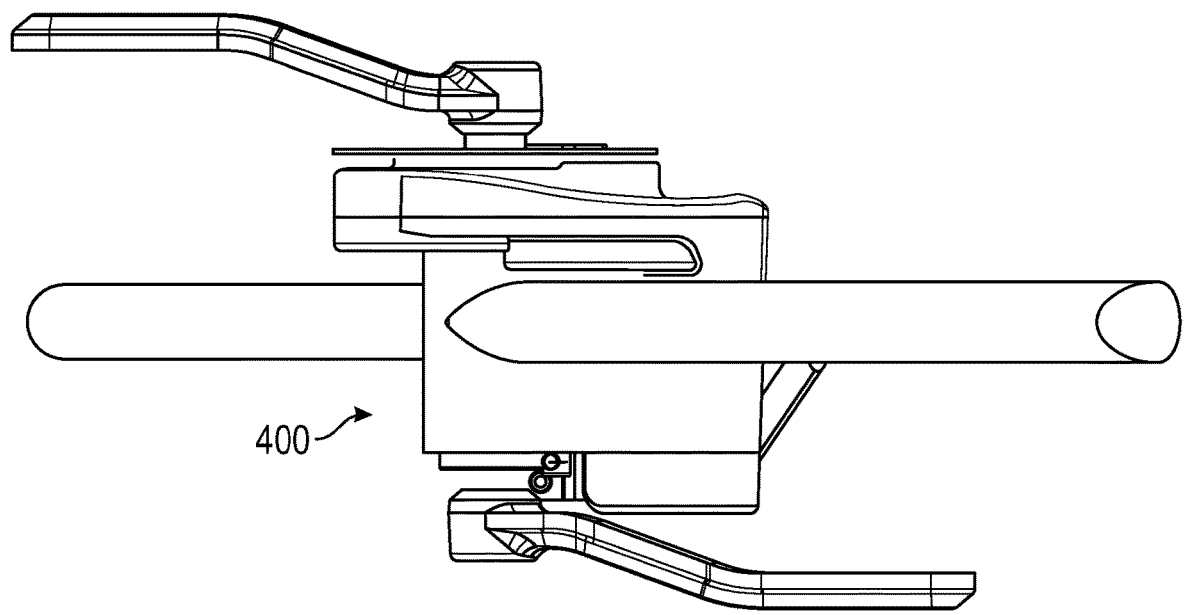
FIG. 9D is a top plan view of the vehicle of FIG. 9A.

The vehicle 10' of FIG. 9A is similar to the vehicle 10 of FIG. 1A and includes a gearbox 400 is mounted to the bottom bracket. In the illustrated embodiment, a bottom bracket shaft 430 is located generally at the point at which the down tube 42' would intersect the seat tube 44'.

Figure 10A:
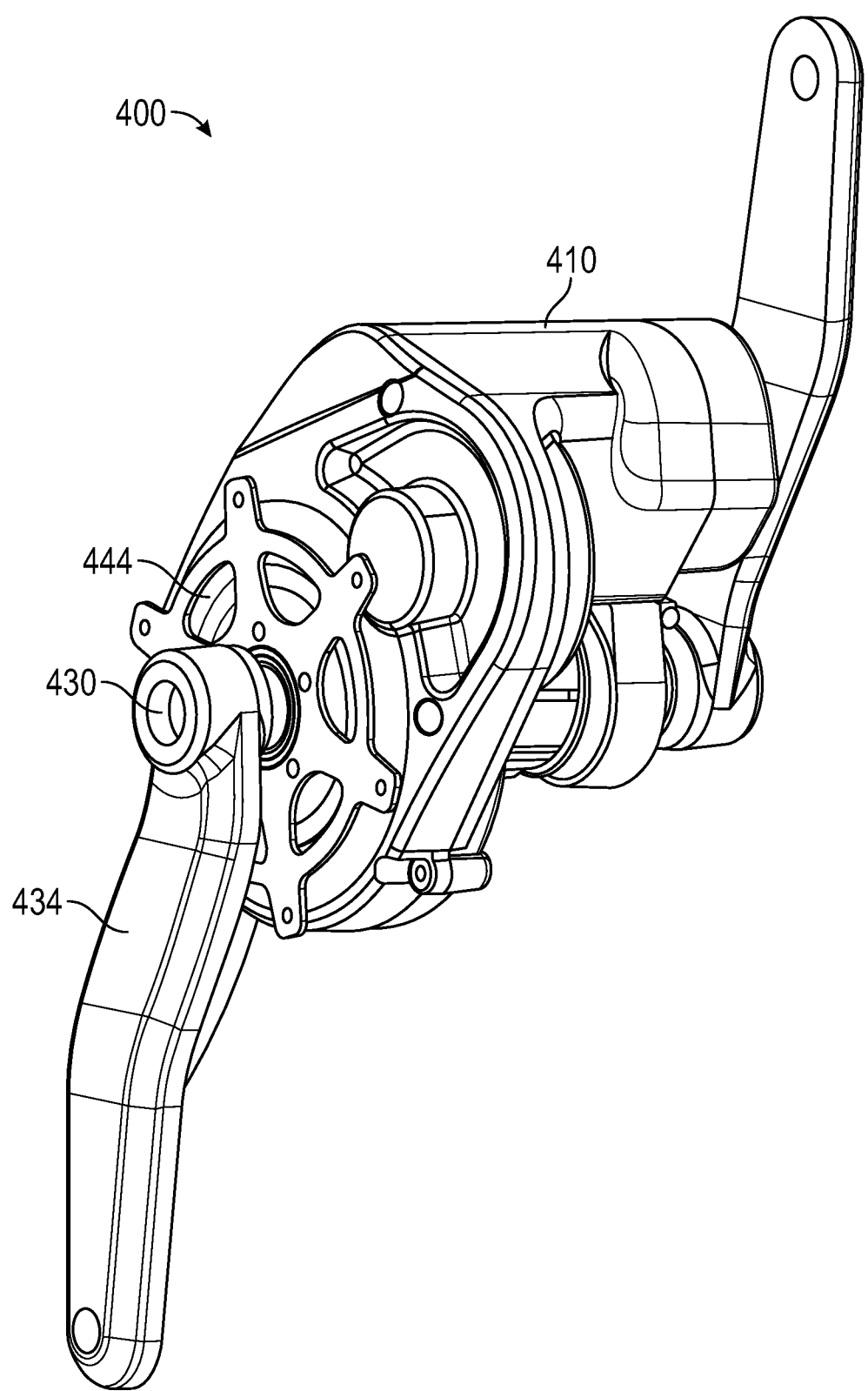
FIG. 10A illustrates a perspective view of a gearbox of the vehicle of FIG. 9A, shown independent of the vehicle.
Figure 11A:
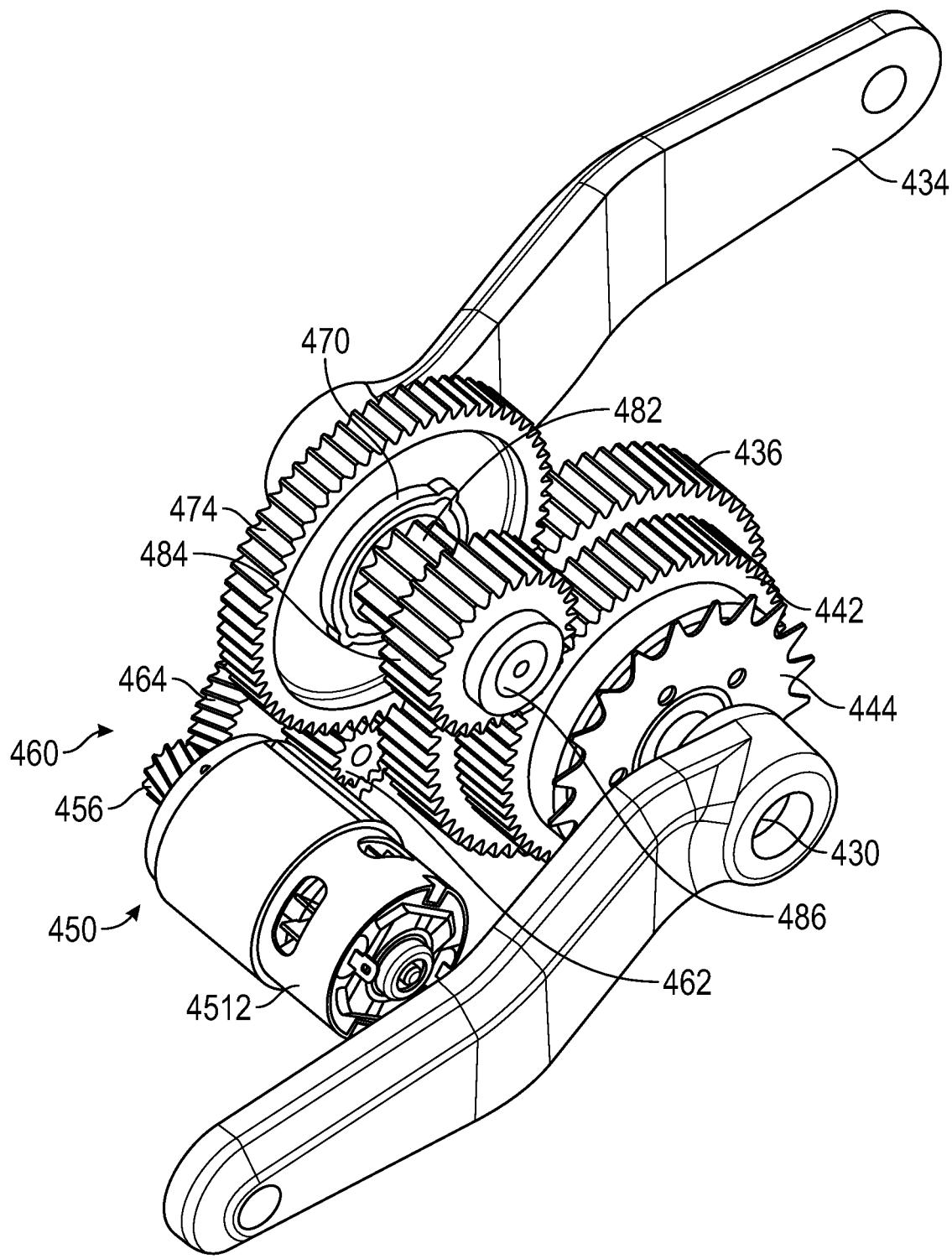
FIG. 11A illustrates a perspective view of certain components of the gearbox of FIG. 10A, shown with the housing and certain additional components removed.
Figure 11B:
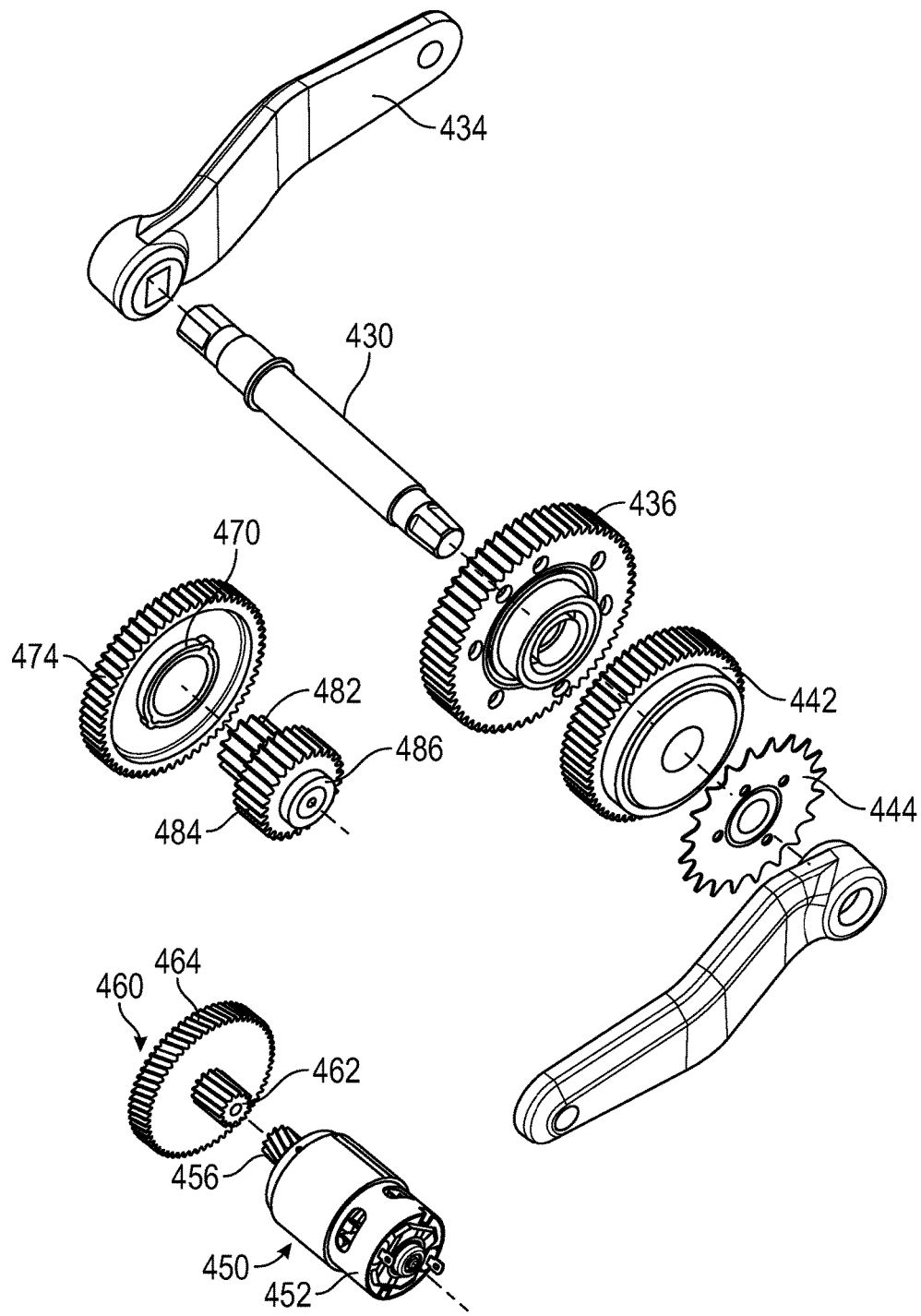
FIG. 11B illustrates an exploded assembly view of the gearbox components of FIG. 11A.

FIG. 10A illustrates a perspective view of a gearbox of the vehicle of FIG. 9A, shown independent of the vehicle. FIG. 10B illustrates a right side view of the gearbox of FIG. 10A. FIG. 10C illustrates a left side view of the gearbox of FIG. 10A. FIG. 11A illustrates a perspective view of certain components of the gearbox of FIG. 10A, shown with the housing and certain additional components removed. FIG. 11B illustrates an exploded assembly view of the gearbox components of FIG. 11A.

Figure 12A:
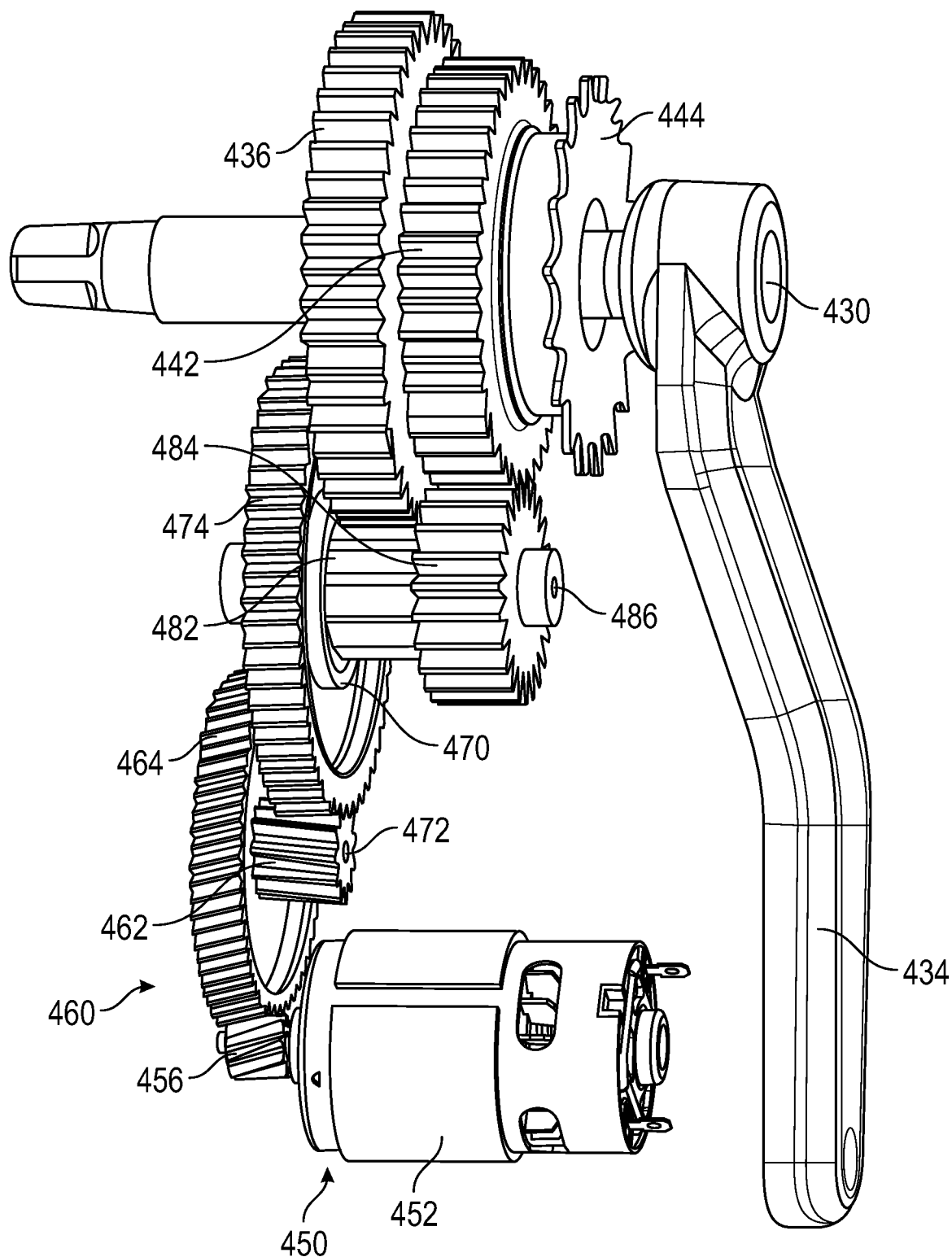
FIG. 12A illustrates a perspective view of the components of FIG. 10A, with the components moved relative to one another so that the axes of each rotary shaft are generally coplanar with one another.
Figure 12B:
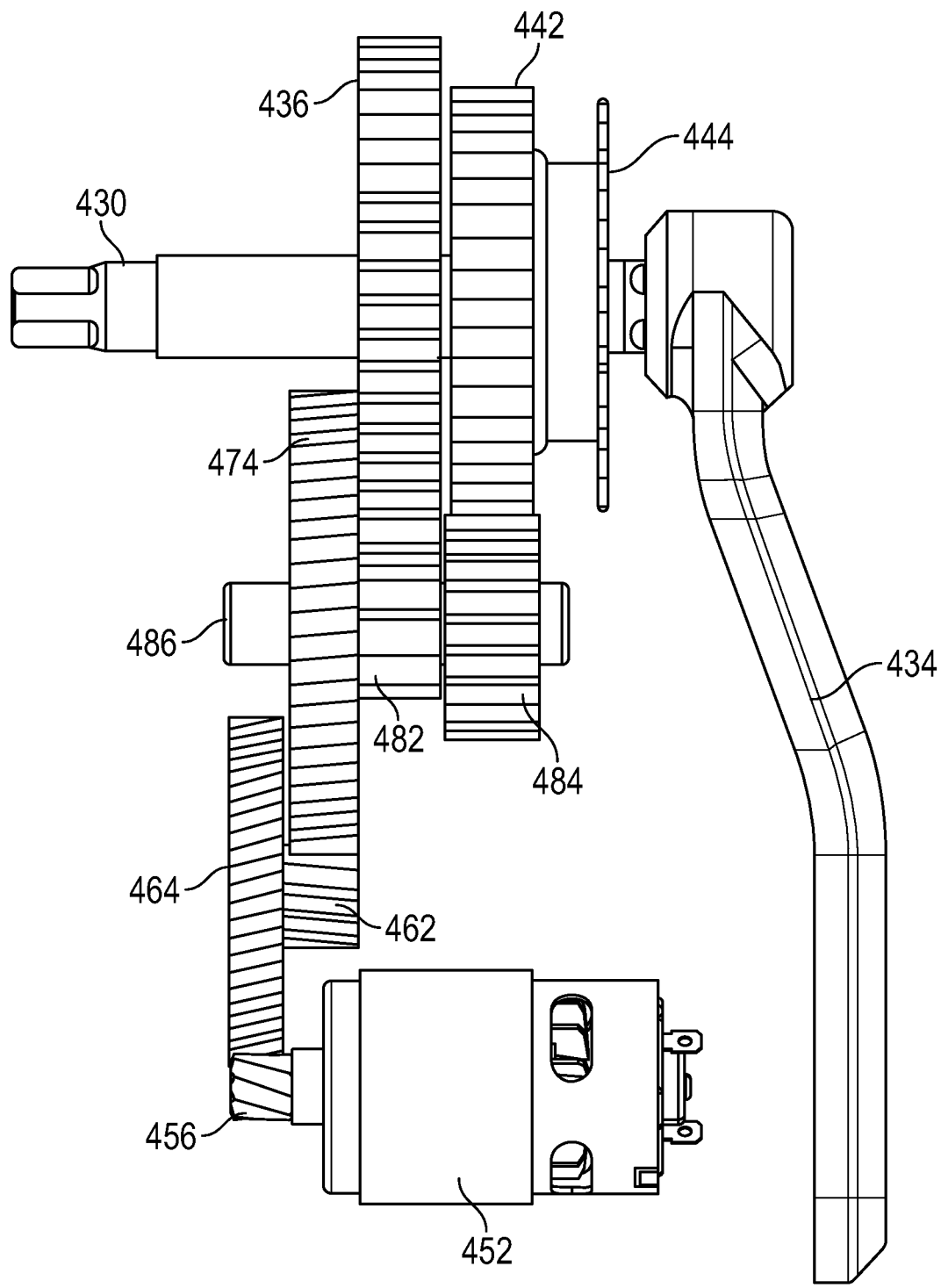
FIG. 12B illustrates a side view of the components of FIG. 11A, arranged as illustrated in FIG. 12A.
Figure 12C:
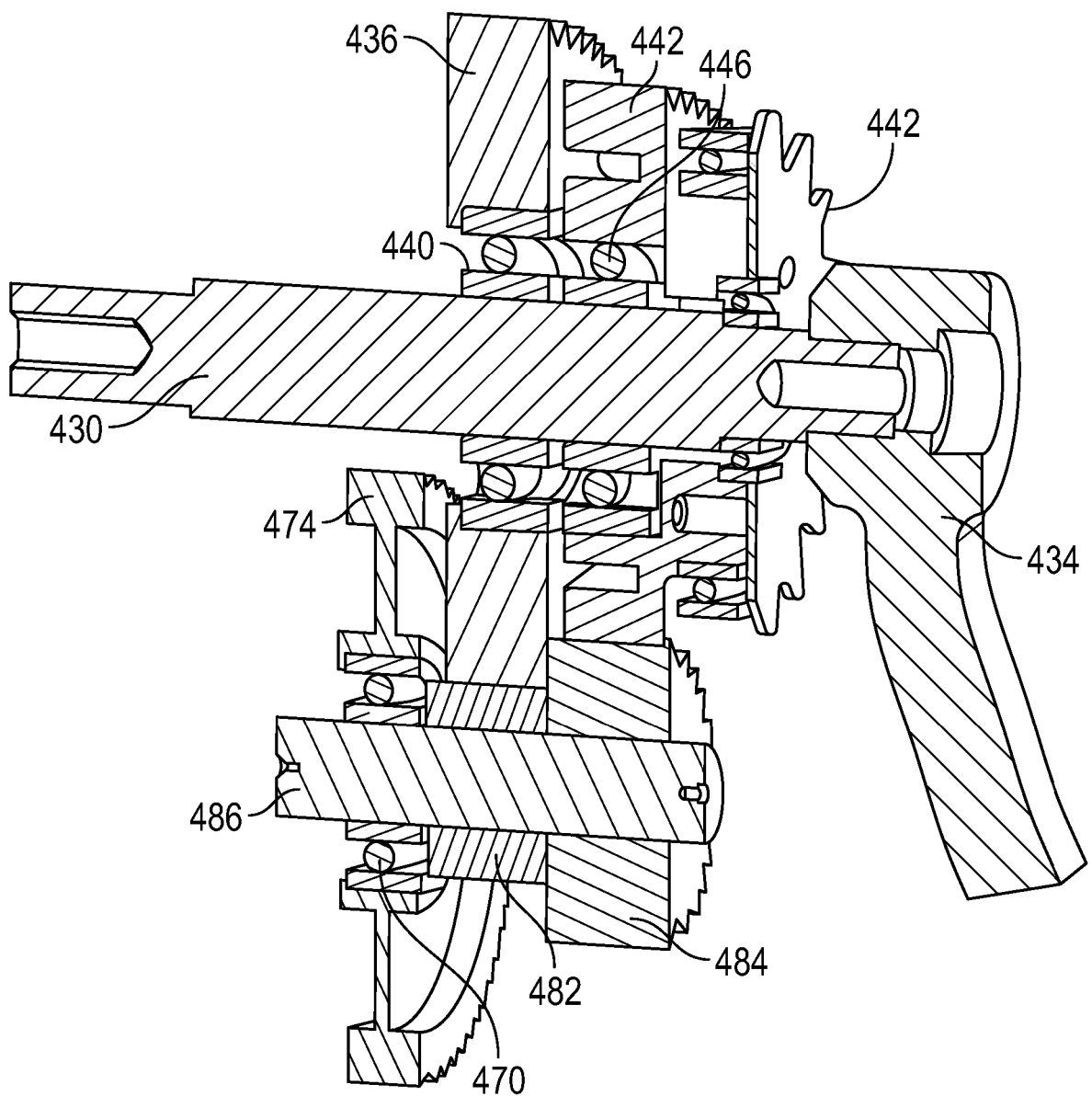
FIG. 12C illustrates a partial cross-sectional view of certain components of FIG. 11A, arranged as illustrated in FIG. 12A.
Figure 13A:
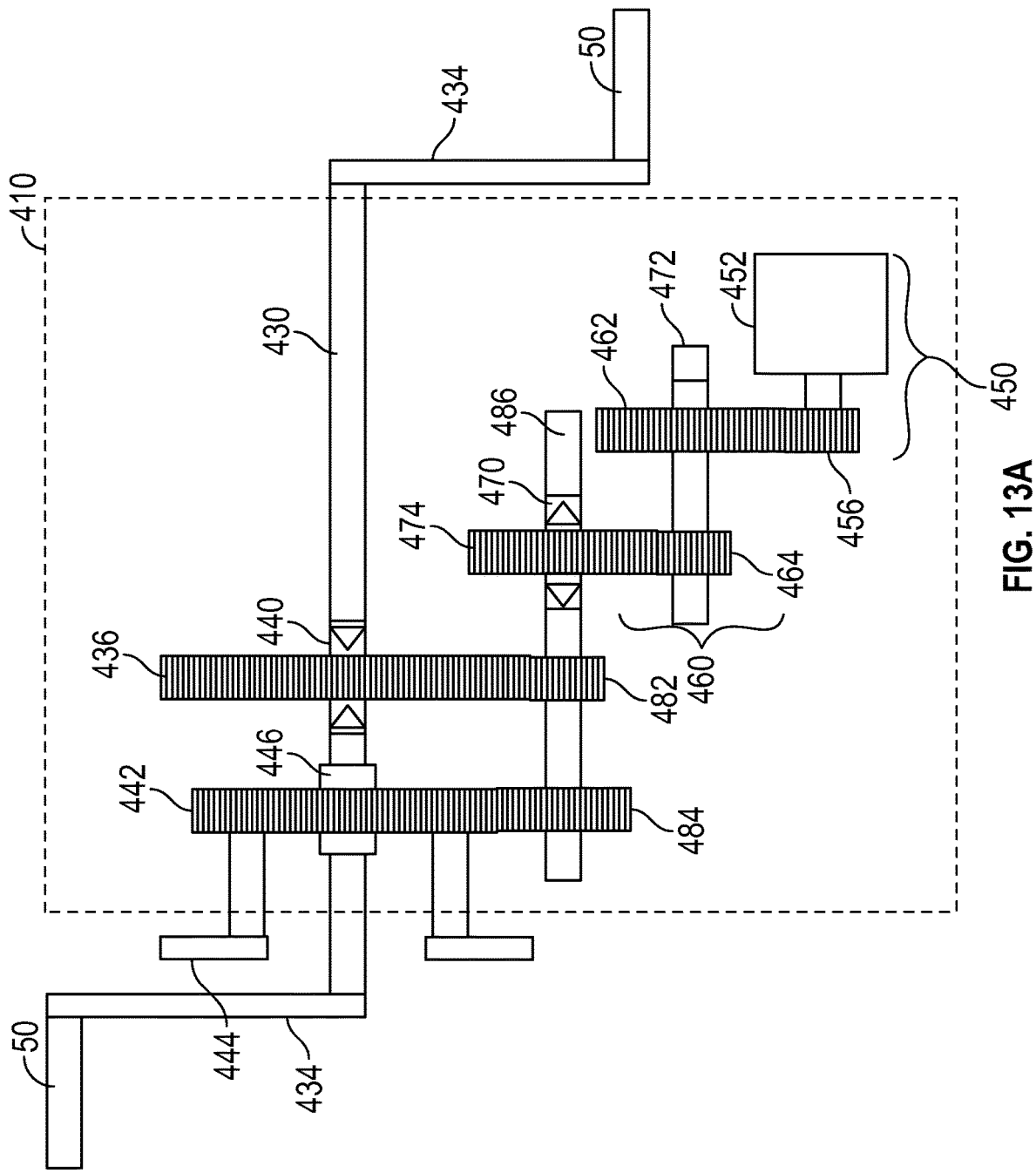
FIG. 13A is a schematic illustration of the components of the gearbox of FIG. 10A.
Figure 13B:
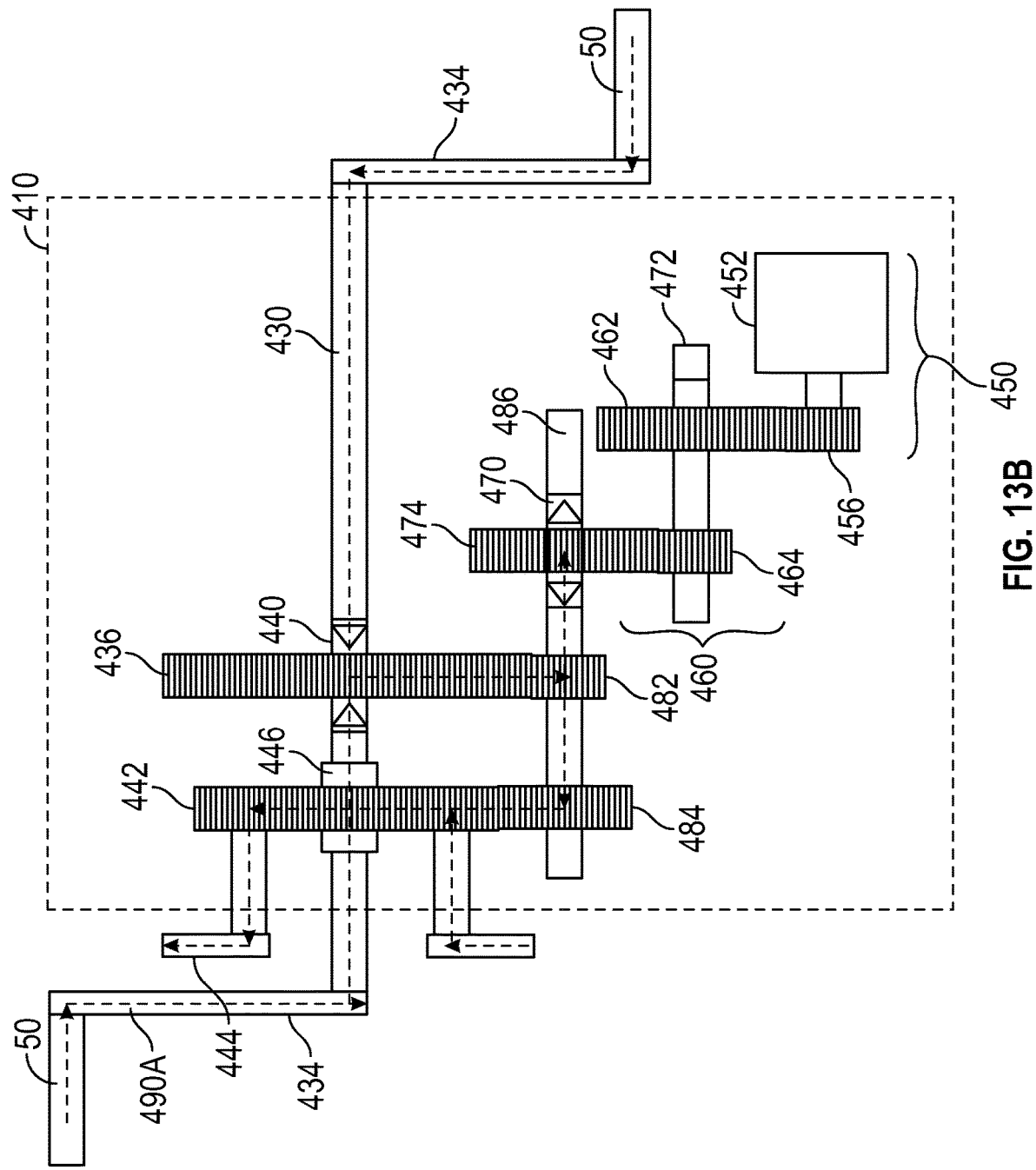
FIG. 13B is the schematic illustration of FIG. 13A, with a power path shown for motive power provided via the pedal assembly.
Figure 13C:
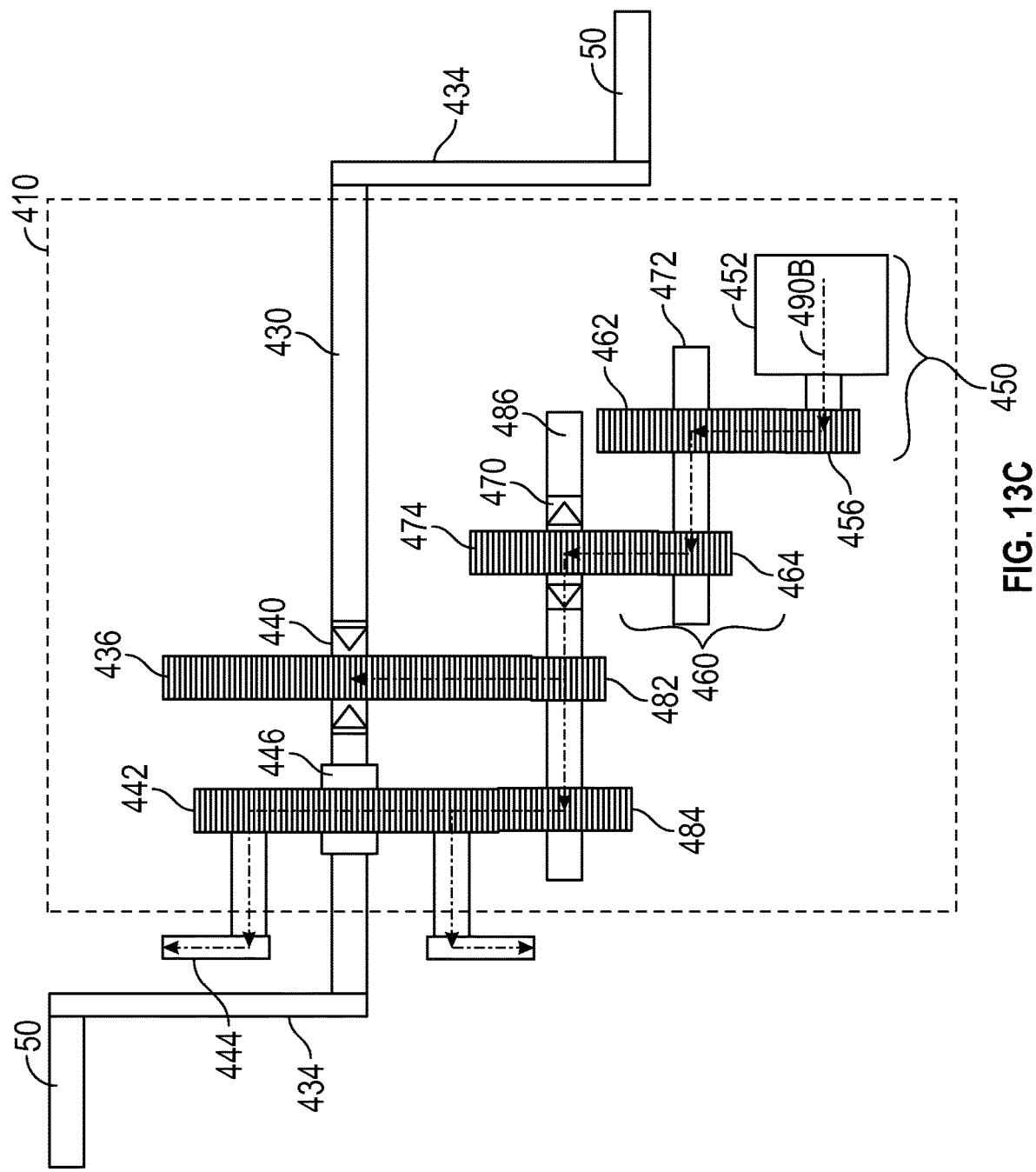
FIG. 13C is the schematic illustration of FIG. 13A, with a power path shown for motive power provided via the motor assembly.

FIG. 12A illustrates a perspective view of the components of FIG. 10A, with the components moved relative to one another so that the axes of each rotary shaft are generally coplanar with one another. FIG. 12B illustrates a side view of the components of FIG. 11A, arranged as illustrated in FIG. 12A. FIG. 12C illustrates a partial cross-sectional view of the components of FIG. 11A, arranged as illustrated in FIG. 12A. FIG. 13A is a schematic illustration of the components of the gearbox of FIG. 10A.

The gearbox 400 includes a bottom bracket shaft 430 which can be rotationally coupled to a pedal crank 434 on each end of the bottom bracket shaft 430. A pedal output gear 436 is connected via a pedal one-way bearing 440 to the bottom bracket shaft 430, and an output gear 442 is connected via a rotary bearing 446 to the bottom bracket 446. The pedal one-way bearing 440 conditionally rotationally couples the pedal output gear 436 to the bottom bracket shaft 430, and the rotary bearing 446 supports the output gear 442 on the bottom bracket shaft 430 without directly rotationally coupling the output gear 442 to the bottom bracket shaft 430.

The gearbox 400 also includes a motor assembly 450 including a motor 452 and an output rotational element in the form of a motor output gear 456. In some implementations, because an additional stage of gear reduction is included in the power path from the motor 452, a planetary gear set may be omitted and/or the angular velocity of the motor output gear 456 may be generally equal to the angular output velocity of the motor 452.

In other embodiments, a motor 452 can include an integrated step-down component, such as a planetary gear system, within the housing of the motor 452 to reduce the angular velocity of the motor output gear 456 relative to the angular velocity of the motor 452 itself, while increasing the output torque.

Like the intermediate step gear set 160 of the gearbox 100, the gearbox 400 can include an intermediate step gear set 460 which includes a lower step gear 462 and an upper step gear 464. The lower step gear 462 can engage the motor output gear 456 of the motor assembly 400 and can have a larger effective radius than the effective radius of the upper step gear 464. However, unlike the intermediate step gear set 160 of the gearbox 100, in certain implementations, the lower step gear 462 and the upper step gear 464 of the intermediate step gear set 460 are not conditionally rotationally coupled to one another via a one-way bearing. Rather, in certain variants, the lower step gear 462 and the upper step gear 464 are instead each coupled to a step gear shaft 472 coaxial with and extending through the upper and lower step gears 464 and 462.

The upper step gear 464 engages a motor transfer gear 474 which is connected, via a motor one-way bearing 470, to an offset shaft 486. The offset shaft 486 supports and is rotationally coupled to each of a first offset step gear 482 which engages the pedal output gear 436 and a second offset step gear 484 which engages the output gear 442.

As discussed above with respect to the gearbox 300, when the bottom bracket shaft 430 is driven by a user rotating the pedals to move the pedal cranks 434 in a first direction, torque will be transferred from the bottom bracket shaft 430 to the pedal output gear 436 via the pedal one-way bearing 440. The pedal output gear 436 will be driven in the first direction, and will in turn drive the first offset step gear 482, as well as the offset shaft 486 and the second offset step gear 484, in the second direction. The rotation of the second offset step gear 484 drives rotation of the output gear 442, with which the second offset step gear 484 is engaged, in the first direction, so that power can be output via the chain wheel 444. This power path is illustrated as power path 490A in FIG. 13B.

Due to the orientation of the motor one-way bearing 470, however, the movement of the inner race of the motor one-way bearing 470 will not induce movement of the outer race of the motor one-way bearing 470, and the motor transfer gear 474 will not be driven in the second direction. The intermediate step gear set 460 and other components along the power path between the motor 452 and the motor transfer gear 474 will be isolated from the motive power provided by rotation of the pedal cranks 434 by the motor one-way bearing 470.

When the motor output gear 456 is driven in the second direction, the intermediate step gear set 460 is driven in the first direction opposite the second direction. In turn, the motor transfer gear 474 is driven in the second direction by the intermediate step gear set 460. The motor one-way bearing transmits torque to the offset shaft 486 during rotation of the motor transfer gear 474 in the second direction, causing both the first offset step gear 482 and the second offset step gear 484 to be driven along with the motor transfer gear 474 in the second direction. The rotation of the second offset step gear 484 drives rotation of the output gear 442, with which the second offset step gear 484 is engaged, in the first direction, so that power can be output via the chain wheel 444. This power path is illustrated as power path 490B in FIG. 13C.

In addition, the rotation of the first offset step gear 482 drives rotation of the pedal output gear 436, with which the second offset step gear 484 is engaged, in the first direction. However, the pedal one-way bearing 440 does not transmit torque to the bottom bracket shaft 430 when the pedal output gear 436 is driven in the first direction. The bottom bracket shaft 430 will therefore be unaffected by the operation of the motor 452 due to the isolation provided by the pedal one-way bearing 440. As the cranks 434 will not be moved, the pedals can remain in a stable position, so that the rider can rest their feed on the pedals during motor-driven operation of the vehicle.

Figure 14B:
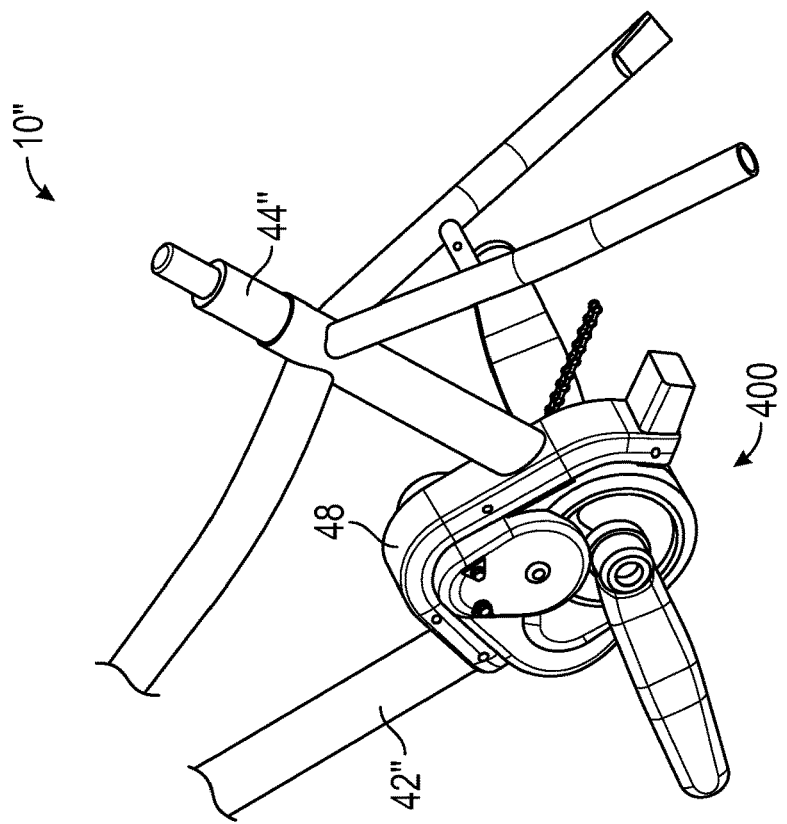
FIGS. 14A and 14B are perspective views illustrating installation of the gearbox of FIG. 10A onto the vehicle of FIG. 9A.
Figure 14A:
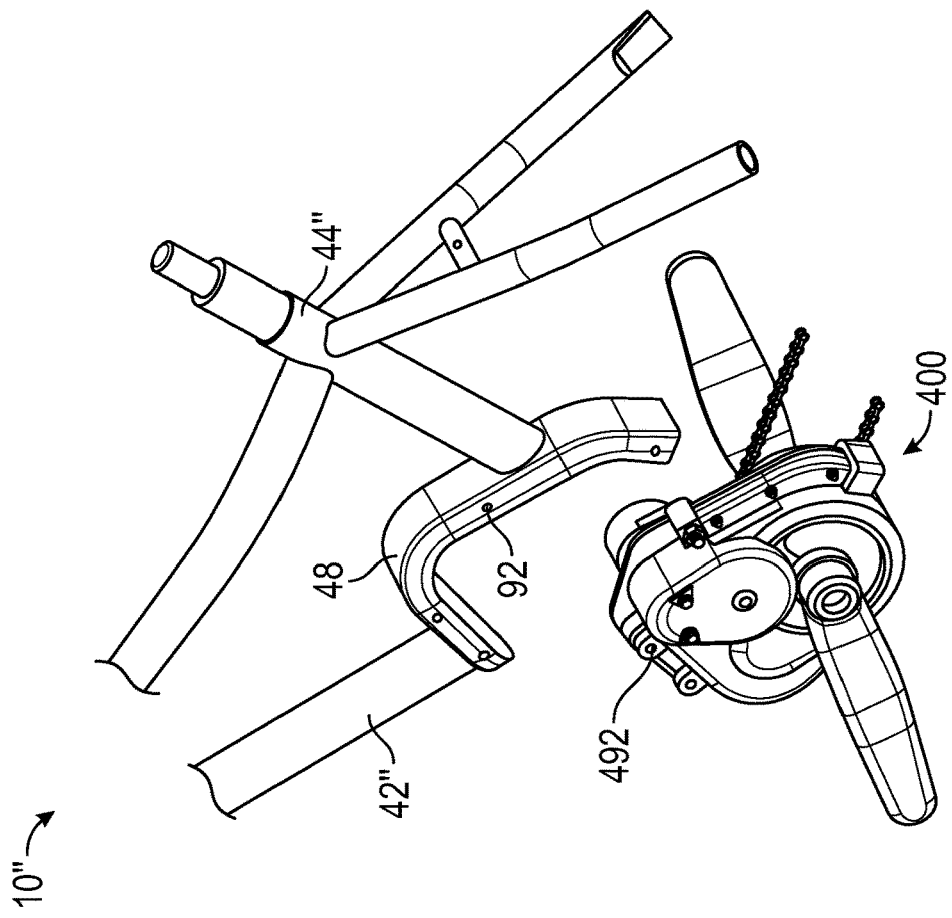

FIGS. 14A and 14B are perspective views illustrating installation of the gearbox of FIG. 10A onto another embodiment of a vehicle. It can be seen in FIG. 14A that a curved bracket 48 extending at least between the down tube 42" and the seat tube 44" is dimensioned and oriented to receive the gearbox 400 in a generally vertical direction. The complementary shapes of the curved bracket 48 and the gearbox 400 will ensure alignment between the gearbox 400 and the curved bracket 48, and alignment between the apertures 92 in the curved bracket 48 and the corresponding apertures 492 in the housing 410 of the gearbox 400.

In FIG. 14B, it can be seen that the gearbox 400 has been seated within the curved bracket 48 and can be secured in place via any suitable method. For example, bolts or other fasteners may be inserted through the apertures 92 in the curved bracket 48 and into the corresponding apertures 492 in the housing 410 of the gearbox 400. In other embodiments, the gearbox 400 may be secured in place via welding, adhesive, or any other suitable securement structure or method.

Certain Additional Aspects

In some embodiments, the gearing arrangements of the various gearboxes may be configured to drive a driven wheel of a vehicle at an angular velocity of roughly 250 rpm. In contrast, the motor may in some embodiments have a raw output angular velocity of roughly 18,000 rpm, and the gearboxes may be configured for a user to pedal at roughly 120 rpm. These angular velocities are one example of a wide range of suitable angular velocities for each of these components, but are illustrative of the relative amounts of gear reductions that may be provided at various points in the power paths of the illustrative gearboxes described herein.

For example, in a gearbox such as gearbox 100, where the power paths converge on the output gear 142 and where the angular velocity of the output gear 142 is the same as the angular velocity of the pedal assembly, the motor power path may undergo a total gear reduction of roughly 150:1 between the motor 152 and the output gear 142. For example, the planetary gear set 154 may provide a gear reduction of roughly 7.2:1, the interface between the motor assembly output 156 and the intermediate gear set 160 may provide a gear reduction of roughly 5:1, and the interface between the intermediate gear set 160 and the output gear 142 may provide a gear reduction of roughly 4:1.

However, because the output gear 142 will be driven at roughly 120 rpm, and the driven wheel is intended to be driven under the same conditions at roughly 250 rpm, the chain drive between the gearbox 100 and the rear wheel 30 can be configured to have a gear ratio of roughly 1:2, roughly doubling the angular velocity of the output gear 142 to achieve the desired angular velocity of the driven wheel. In such an embodiment, this gear reduction and subsequent gear increase along the chain portion of the power path may impact the efficiency of the gearbox 100.

In contrast, because the power paths of the gearbox 400 converge prior to the output gear 442 and rotationally coupled chain wheel 444, the chain wheel 444 can be configured to be driven at the same angular velocity as the target angular velocity of the driven wheel. In such an embodiment, the motor power path may undergo a total gear reduction of roughly 75:1 between the motor 452 and the output gear 442. For example, the interface between the motor assembly output gear 456 and the intermediate gear set 460 may provide a gear reduction of roughly 7.2:1, the interface between the intermediate gear set 160 and the motor transfer gear 474 may provide a gear reduction of roughly 5:1, and the interface between the second offset step gear 484 and the output gear 442 may be roughly 2:1. The power path between the pedal cranks 434 and the first offset step gear 482 may include a total gear increase of roughly 1:4. Because the chain portion of the power paths does not include a gear increase, the gearbox 400 may under these illustrative conditions be operate more efficiently than the gearbox 100.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure. Any feature from one embodiment can be included in any other embodiment. No element, feature, step, or aspect is critical or essential.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain Terminology

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Some embodiments have been described in connection with the accompanying drawings. The figures are drawn to scale, but such scale is not limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

Various embodiments and examples of mid-drive motorized drive units, and associated vehicles and methods, have been disclosed herein. Although the invention has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future.

What is claimed is:

1. A gearbox adapted for use on a mid-drive e-bike, the e-bike having footpedals and a driven wheel, the gearbox comprising:
   an electric motor;
   a plurality of gears;
   a first one-way bearing that is coaxial with a first axis of rotation; and a second one-way bearing that is coaxial with a second axis of rotation, the second axis of rotation being spaced apart from the first axis of rotation;

the first one-way bearing configured to enable power from the electric motor to be delivered to the driven wheel;

the second one-way bearing configured to enable power from the footpedals to be delivered to the driven wheel; and the gearbox configured to enable a user to propel the e-bike with: the footpedals alone, with the electric motor alone, and simultaneously with the footpedals and the electric motor.

2. The gearbox of claim 1, wherein the gearbox includes a chain wheel configured to receive power from the electric motor and the footpedals and deliver the power to the driven wheel via a chain.

3. The gearbox of claim 2, additionally comprising a bottom bracket shaft rotationally coupled to the footpedals, wherein the chain wheel is rotationally coupled to an output gear supported the bottom bracket shaft.

4. The gearbox of claim 3, wherein the output gear is conditionally rotationally coupled to the bottom bracket shaft by the second one-way bearing.

5. The gearbox of claim 3, wherein the output gear is supported on the bottom bracket shaft by a rotary bearing which allows the output gear to rotate independent of the bottom bracket shaft when no power is being provided via the footpedals.

6. The gearbox of claim 2, wherein the plurality of gears comprise an intermediate step gear set forming part of a motor power path from the electric motor to the chain wheel.

7. The gearbox of claim 6, wherein the intermediate step gear set comprises an upper step gear set conditionally rotationally coupled to a lower step gear set by the first one-way bearing.

8. The gearbox of claim 1, wherein the gearbox forms part of a mid-drive unit axially offset from an axis of rotation of the driven wheel.

9. A bicycle, comprising:
a frame;
a driven wheel supported by the frame;
a pedal assembly having a bottom bracket shaft configured to rotate about a pedal axis;
an electric motor; and
a gearbox supported by the frame, the gearbox comprising:
a first one-way bearing forming part of a motor power path between the electric motor and an output gear operably coupled to the driven wheel to deliver power to the driven wheel, the first one-way bearing being coaxial with the pedal axis; and
a second one-way bearing forming part of a pedal power path between the pedal assembly and the output gear, the second one-way bearing being offset from the pedal axis.

10. The bicycle of claim 9, wherein the pedal assembly further comprises:

first and second pedal cranks rotationally coupled to the bottom bracket shaft at respective ends of the bottom bracket shaft.

11. The bicycle of claim 10, wherein the output gear is supported on the bottom bracket shaft by the second one-way bearing.

12. The bicycle of claim 10, wherein the output gear is supported on the bottom bracket shaft by a rotary bearing, the gearbox additionally comprising a pedal output gear supported on the bottom bracket shaft by the second one-way bearing.

13. The bicycle of claim 12, wherein the first one-way bearing supports a motor transfer gear on an intermediate shaft axially offset from the bottom bracket shaft, the motor transfer gear operably connected to the electric motor.

14. The bicycle of claim 13, wherein the intermediate shaft is rotationally coupled to a first offset gear engaged with the pedal output gear and a second offset gear engaged with the output gear.

15. The bicycle of claim 13, wherein the motor transfer gear is operably connected to the electric motor by an intermediate step gear set supported by a step gear shaft.

16. A gearbox configured to be secured to a bicycle frame, the gearbox comprising:
a chain wheel configured to engage a chain of the bicycle to deliver power to a drive wheel of the bicycle via a chain;
a bottom bracket shaft configured to receive power from a pedal assembly of the bicycle and to rotate about a pedal axis of rotation;
a step gear configured to receive power from an electric motor and to rotate about a step gear axis of rotation;
a first one-way bearing forming part of a pedal power path between at least the bottom bracket shaft and an output gear operably coupled to the chain wheel, the first one-way bearing coaxial with the pedal axis of rotation; and
a second one-way bearing forming part of a motor power path between at least the step gear and the output gear operably coupled to the chain wheel, the second one-way bearing coaxial with the step gear axis of rotation.

17. The gearbox of claim 16, wherein the output gear is supported on the bottom bracket shaft by the first one-way bearing.

18. The gearbox of claim 16, wherein the first one-way bearing and the output gear are supported on the bottom bracket shaft at different locations along the bottom bracket shaft.

19. The gearbox of claim 16, wherein the step gear is supported on a step gear shaft by the second one-way bearing.

20. The gearbox of claim 16, additionally including the electric motor, the electric motor located at least partially within a housing of the gearbox.

* * * * *